(12) United States Patent
Morimoto et al.

(10) Patent No.: US 7,948,664 B2
(45) Date of Patent: May 24, 2011

(54) IMAGE PROCESSING METHOD, IMAGE PROCESSING APPARATUS, DOCUMENT READING APPARATUS, IMAGE FORMING APPARATUS, COMPUTER PROGRAM AND RECORDING MEDIUM

(75) Inventors: Atsuhisa Morimoto, Nara (JP); Masakazu Ohira, Nara (JP)

(73) Assignee: Sharp Kabushiki Kaisha, Osaka-shi (JP)

( * ) Notice: Subject to any disclaimer, the term of this patent is extended or adjusted under 35 U.S.C. 154(b) by 927 days.

(21) Appl. No.: 11/892,392

(22) Filed: Aug. 22, 2007

(65) Prior Publication Data
US 2008/0049264 A1 Feb. 28, 2008

(30) Foreign Application Priority Data

Aug. 24, 2006 (JP) ................... 2006-228354
Aug. 8, 2007 (JP) ................... 2007-207094

(51) Int. Cl.
*H04N 1/04* (2006.01)

(52) U.S. Cl. ........ 358/474; 358/1.9; 358/403; 358/1.15; 358/3.28; 382/182; 382/181; 382/195; 345/173; 345/649

(58) Field of Classification Search .................. 358/474, 358/403, 1.9, 1.15, 464, 1.18, 3.28, 527; 382/182, 181, 195, 218, 282, 305, 254, 275, 382/209; 345/173, 649
See application file for complete search history.

(56) References Cited

U.S. PATENT DOCUMENTS

| | | | | |
|---|---|---|---|---|
| 5,465,353 A * | 11/1995 | Hull et al. | ............... | 1/1 |
| 5,799,115 A * | 8/1998 | Asano et al. | .................. | 382/305 |
| 6,928,435 B2 * | 8/2005 | Lee et al. | ............... | 1/1 |
| 7,639,387 B2 * | 12/2009 | Hull et al. | ..................... | 358/1.18 |
| 7,725,499 B1 * | 5/2010 | von Lepel et al. | ............. | 707/803 |
| 7,813,007 B2 * | 10/2010 | Kakutani | ..................... | 358/3.13 |
| 2006/0204111 A1* | 9/2006 | Koshi et al. | ................... | 382/229 |
| 2007/0046982 A1* | 3/2007 | Hull et al. | ..................... | 358/1.15 |
| 2007/0047819 A1* | 3/2007 | Hull et al. | ..................... | 382/190 |
| 2007/0070423 A1* | 3/2007 | Kakutani | ..................... | 358/3.01 |
| 2007/0248266 A1* | 10/2007 | Matsuno | ...................... | 382/180 |
| 2008/0068641 A1* | 3/2008 | Dance et al. | ................. | 358/1.15 |
| 2009/0207430 A1* | 8/2009 | Hirose et al. | .................. | 358/1.9 |
| 2010/0053687 A1* | 3/2010 | Matsuda | ..................... | 358/3.24 |
| 2010/0177959 A1* | 7/2010 | Withum et al. | ............... | 382/163 |

FOREIGN PATENT DOCUMENTS

| | | | |
|---|---|---|---|
| JP | 7-282088 | A | 10/1995 |
| JP | 10-198705 | A | 7/1998 |
| JP | 3469345 | B2 | 9/2003 |
| JP | 2004-217362 | A | 8/2004 |
| WO | WO-2006/092957 | A1 | 9/2006 |

* cited by examiner

*Primary Examiner* — Negussie Worku
(74) *Attorney, Agent, or Firm* — Birch, Stewart, Kolasch & Birch, LLP

(57) ABSTRACT

A similarity calculation process section registers the largest number of votes of the image of the first document, the index representing the document, and the category of the document into a category table. For the images of the documents being successively read after the document being read first, the similarity calculation process section determines the similarity of the documents based on the result of the voting inputted from a vote process section. When the similarity is lower than a threshold value, determining that the images are not similar to the image of the document registered in the category table, the similarity calculation process section registers the indices representing the documents, the largest numbers of votes of the documents and new categories into the category table, and outputs the result of the determination (classification signal).

21 Claims, 30 Drawing Sheets

F I G. 4

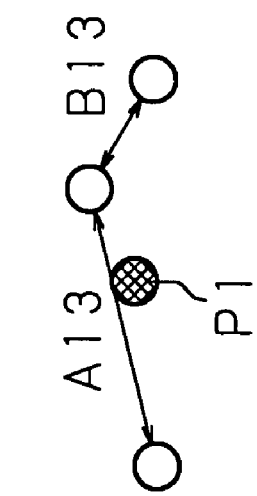
F I G. 7C
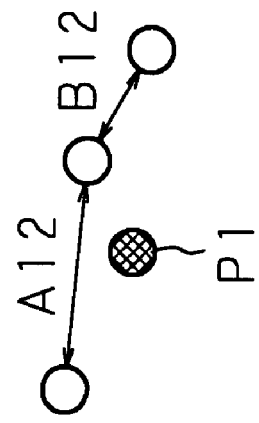
F I G. 7B
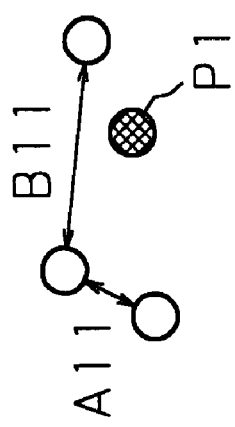
F I G. 7A

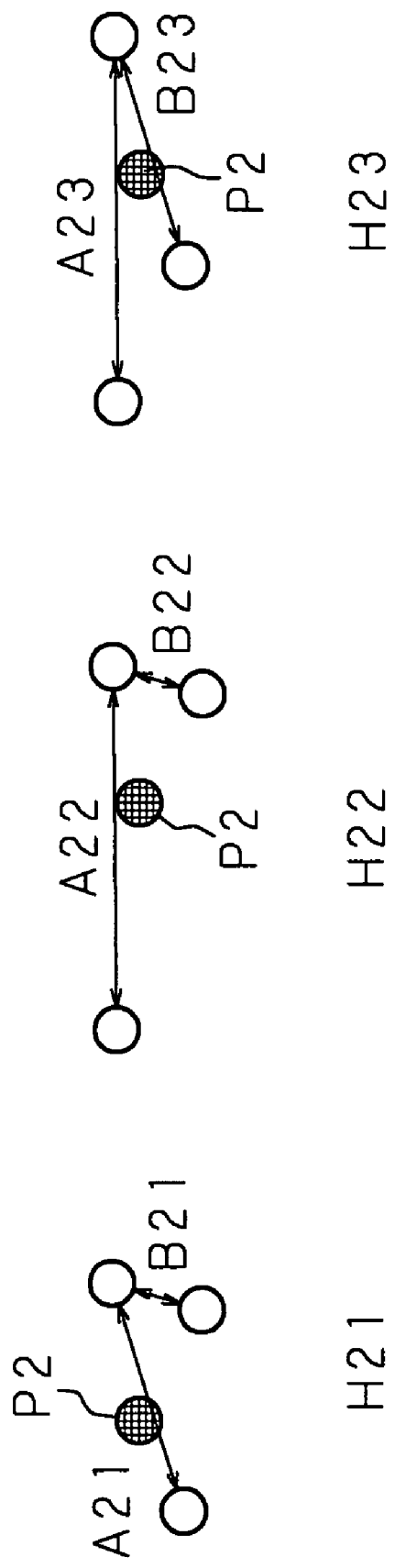

FIG. 11A

| HASH VALUE | INDEX REPRESENTING DOCUMENT |
|---|---|
| H1 | ID1 |
| H2 | ID1 |
| H3 | ID1、ID2 |
| H4 | ID1 |
| H5 | ID1 |
| H6 | ID1、ID2 |
| ⋮ | ⋮ |

FIG. 11B

| HASH VALUE | INDEX REPRESENTING DOCUMENT |
|---|---|
| H1 | ID1、ID1 |
| H2 | ID1 |
| H3 | ID1、ID2 |
| H4 | ID1 |
| H6 | ID1、ID2 |
| ⋮ | ⋮ |

F I G. 1 2

| INDEX REPRESENTING DOCUMENT | HIGHEST NUMBER OF VOTES | CATEGORY |
|---|---|---|
| ID1 | M1 | C1 |
| ID2 | M2 | C2 |
| ⋮ | ⋮ | ⋮ |

FIG. 13A

| HASH VALUE | INDEX REPRESENTING DOCUMENT |
|---|---|
| H1 | ID1 |
| H2 | ID1 |
| H3 | ID1 |
| H4 | |
| H5 | ID1 |
| H6 | |
| ⋮ | ⋮ |

FIG. 13B

| INDEX REPRESENTING DOCUMENT | HIGHEST NUMBER OF VOTES | CATEGORY |
|---|---|---|
| ID1 | M1 | C1 |

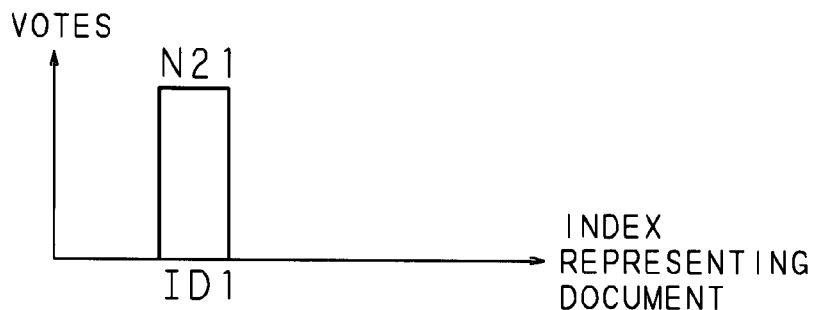

| HASH VALUE | INDEX REPRESENTING DOCUMENT |
|---|---|
| H1 | ID1 |
| H2 | ID1, ID2, ID3 |
| H3 | ID1, ID2 |
| H4 | ID2, ID3 |
| H5 | ID1 |
| H6 | ID2, ID3 |
| ⋮ | ⋮ |

| INDEX REPRESENTING DOCUMENT | HIGHEST NUMBER OF VOTES | CATEGORY |
|---|---|---|
| ID1 | M1 | C1 |
| ID2 | M2 | C2 |
| ID3 | M3 | C3 |

IMAGE PROCESSING METHOD, IMAGE PROCESSING APPARATUS, DOCUMENT READING APPARATUS, IMAGE FORMING APPARATUS, COMPUTER PROGRAM AND RECORDING MEDIUM

CROSS-REFERENCE OF RELATED APPLICATION

This non-provisional application claims priority under 35 U.S.C. §119(a) on Patent Application No. 2006-228354 and No. 2007-207094 in Japan on Aug. 24, 2006 and Aug. 8, 2007 respectively, the entire contents of which are hereby incorporated by reference.

BACKGROUND

1. Technical Field

The present invention relates to an image processing method and an image processing apparatus for performing the processing to extract a plurality of feature vectors of each of the images obtained by successively reading a plurality of documents and classify the documents based on the extracted feature vectors, an document reading apparatus having the image processing apparatus, an image forming apparatus having the document reading apparatus, a computer program for realizing the image processing apparatus and a recording medium recording the computer program for realizing the image processing apparatus.

2. Description of Related Art

A technology is known of reading an document by a scanner, recognizing the document format information from the input image obtained by reading the document, classifying the input image by performing matching processing for each element based on the recognized document format information, and filing the input image according to the result of the classification.

For example, recognition processing such as line segment extraction, character frame extraction, character recognition or frame recognition is performed on the input image. Pieces of information such as the center coordinates of the frame data, the center coordinates of the character string frame, and the concatenation frame information are extracted from the result of the recognition. The invariant is calculated from the extracted information. By creating pieces of data necessary for table management (the invariant, the model name, the parameters used for calculating the invariant, etc.) and registering them in a hash table, the format is registered.

When the format is recognized, recognition processing is performed on the input image. Pieces of information such as the center coordinates of the frame data, the center coordinates of the character string frame, and the concatenation frame information are extracted from the result of the recognition. The invariant for each piece of information is calculated, and the corresponding area of the hash table is searched by using the calculated invariant. Voting is performed for each registered document name within the searched area. These processings are repeated for each feature point of the input image, and similarity is calculated with the model of the highest histogram as the result of the recognition. When it is determined that the input image is registered, an identifier is assigned to the input image and the input image is stored. An image filing apparatus is proposed that is capable of reducing the number of processing steps performed by the user by performing the above-described processing to thereby automatically perform matching for each element based on the document format information (see Japanese Patent No. 3469345).

SUMMARY

However, in the apparatus of Japanese Patent No. 3469345, it is necessary to store the document format information. In addition, in order to accurately classify various documents, it is necessary to store an enormous amount of document format information. Thus, there is a problem in that the storage capacity for storing the document format information is increased. Further, although it is possible to assign an identifier to the input image and file, as electronic data, the document classified based on the assigned identifier, it is impossible to classify the document itself which is paper medium. To classify the document itself, visual classification by the user is required, and when a particularly large number of documents are classified, the amount of work necessarily performed by the user is enormous. Thus, improvement in user convenience is demanded.

An object of the present invention is to provide an image processing method and an image processing apparatus capable of classifying documents without the need for storing the document format information or the like of the documents, an document reading apparatus having the image processing apparatus, an image forming apparatus having the document reading apparatus, and a recording medium recording a computer program for realizing the image processing apparatus.

An object of the present invention is to provide an image processing method and an image processing apparatus capable of classifying or filing electronic data or scanned and filed data without the need for storing the document format information of such data, and a recording medium recording a computer program for realizing the image processing apparatus.

Another object of the present invention is to provide an image processing method and an image processing apparatus capable of classifying documents according to a predetermined classification number, an document reading apparatus having the image processing apparatus, an image forming apparatus having the document reading apparatus, and a recording medium recording a computer program for realizing the image processing apparatus.

Another object of the present invention is to provide an image processing method and an image processing apparatus capable of distinguishing between the documents or the image data that can be classified and the documents or the image data that cannot be classified when documents or the image data that cannot be classified according to a predetermined classification number are present, an document reading apparatus having the image processing apparatus, an image forming apparatus having the document reading apparatus, and a recording medium recording a computer program for realizing the image processing apparatus.

Another object of the present invention is to provide an image processing method and an document reading apparatus capable of reclassifying the documents or the image data similar to each other among the documents or the image data classified as nonsimilar once, an image forming apparatus having the document reading apparatus, and a recording medium recording a computer program.

Another object of the present invention is to provide an image processing apparatus capable of classifying documents or the image data according to the predetermined classification number, an document reading apparatus having the image processing apparatus, and an image forming apparatus having the document reading apparatus.

Another object of the present invention is to provide an document reading apparatus capable of easily sorting classified documents, and an image forming apparatus having the document reading apparatus.

There is provided an image processing method, according to an aspect, for extracting a plurality of feature vectors of each of images (or the input image data) obtained by successively reading a plurality of documents, and performing processing to classify the plurality of documents (or the image data) based on the extracted feature vectors, the method comprising:

a first storage step of storing the feature vectors of the image of the document being read first (or the image data being input first) and an identifier assigned for classifying the document;

a determination step of determining whether or not the feature vectors of the images of the documents successively read (or the image data being successively input) subsequently to the document being read first (or the image data being input first) match with the feature vectors of the image of the document (or the image data) classified by the stored identifier;

a voting step of voting, when it is determined that the feature vectors match, the image (or the image data) from which the matching feature vectors are extracted,;

a decision step of deciding whether the stored identifier is assigned or a new identifier is assigned to the documents being successively read (the image data being successively input), based on the number of votes obtained by the voting;

a second storing step of storing, when the new identifier is assigned, the feature vectors of the image of the document (or the image data) classified by the identifier, and the identifier; and a step of classifying the documents based on the assigned identifier.

According to the aspect, when a plurality of documents are successively read, the feature vectors (for example, hash values calculated as invariants by identifying connected areas in a binary image obtained by binarizing the image, extracting the centroids of the identified connected areas as feature points, and selecting a plurality of feature points from the extracted feature points) of the image of the document being read first and the identifier (for example, the category of the document) assigned for classifying the document are stored. For the documents being successively read after the document being read first, it is determined whether or not the extracted feature vectors match with the feature vectors of the image of the document classified by the identifier. When it is determined that the feature vectors match, for each matching feature vector, the image from which the feature vector is extracted is voted. Based on the number of votes obtained by the voting, whether the stored identifier is assigned or a new identifier is assigned to the documents being successively read is determined. For example, when the number of votes is equal to or higher than a predetermined threshold value, the identifier of the document corresponding to the image obtaining the number of votes is assigned to the document being read, and when the number of votes is smaller than the predetermined threshold value, a new identifier different from the stored identifier is assigned to the document being read. When the new identifier is assigned, the feature vectors of the image of the document classified by the identifier, and the identifier are stored, and the document is classified by the assigned identifier. Thereby, first, the feature vectors of the image of the document being read first and the identifier assigned for classifying the document are stored, and the previously assigned identifier is assigned or a new identifier is assigned to the documents being successively read thereafter based on the number of votes, whereby the documents being read are classified.

There is provided an image processing method according to an aspect, further comprising a calculation step of calculating an image (or image data) similarity based on the number of votes obtained by the voting, wherein the decision step includes a step of deciding, when the number of stored identifiers does not reach a predetermined number, whether the stored identifier is assigned or the new identifier is assigned to the documents being successively read (image data being successively input), based on the calculated image (or image data) similarity.

According to the aspect, the image (or image data) similarity is calculated based on the number of votes obtained by the voting. For example, the similarity can be defined as the ratio of the number of votes to the largest number of votes. In this case, the largest number of votes can be calculated by multiplying the number of feature points extracted based on the image (or the image data) by the number of feature vectors (for example, hash values) that can be calculated from one feature point. When the number of stored identifiers does not reach a predetermined number (for example, the default classification number or the classification number specified by the user), whether the stored identifier is assigned or a new identifier is assigned to the documents being successively read (the image data being successively input) is decided based on the calculated image (or image data) similarity. Thereby, the documents (or the image data) are classified according to the predetermined classification number.

There is provided an image processing method according to an aspect, wherein the decision step includes a step of deciding, when the number of stored identifiers reaches the predetermined number, whether the stored identifier is assigned to the documents being successively read (or the image data being successively input) or the documents (or the image data) are classified as nonsimilar based on the calculated image (or image data) similarity.

According to the aspect, when the number of stored identifiers reaches the predetermined number, whether the stored identifier is assigned to the documents being successively read or the documents are classified as nonsimilar is decided based on the calculated image similarity. Thereby, the documents that can be classified and the documents that cannot be classified within the range of the predetermined classification number are distinguished from each other.

There is provided an image processing method according to an aspect, wherein when an document (image data) classified as nonsimilar is present, the following steps are repeated at least once: an erasure step of erasing the stored feature vectors and identifier; reading the document (the image data); the first storage step; the determination step; the voting step; the calculation step; the decision step; and the second storage step.

According to the aspect, when there is an document classified as nonsimilar, the stored feature vectors and identifier are erased. Thereby, the feature vectors and the identifier related to the already classified document are erased. The documents classified as nonsimilar are successively read, the feature vectors of the image of the document being read first and the identifier assigned for classifying the document are stored, and for the documents being successively read thereafter, it is determined whether or not the extracted feature vectors match with the feature vectors of the image of the document classified by the identifier. When it is determined that the feature vectors match, for each matching feature vector, the image from which the feature vector is extracted is voted, and based on the number of votes obtained by the voting, whether the stored identifier is assigned or a new identifier is assigned to the documents being successively read is determined. When the new identifier is assigned, the feature vectors of the image of the document classified by the identifier, and the identifier are stored. Thereby, the following are repeated as least once: the documents classified as non-similar are reread; the feature vectors of the image of the document being read first and the identifier assigned for classifying the document are stored; and based on the number of votes, the previously assigned identifier is assigned or a new identifier is assigned to the documents successively read thereafter.

There is provided an image processing apparatus, according to an aspect, for extracting a plurality of feature vectors of each of images obtained by successively reading a plurality of documents (or image data being successively input), and performing processing to classify the documents (the image data) based on the extracted feature vectors, the apparatus comprising:

a storage that stores the feature vectors of the image of the document being read first (or the image data being input first) and an identifier assigned for classifying the document (the image data);

a vote process section that votes, when the feature vectors of the images of the documents being successively read (or image data being successively input) subsequently to the document being read first (the image data being input first) match with the feature vectors of the image of the document (or the image data) classified by the stored identifier, the image from which matching feature vectors are extracted, an identifier assignment process section that assigns the stored identifier to the documents being successively read (the image data being successively input) or assigns a new identifier to the documents being successively read (the image data being successively input) based on the number of votes obtained by the voting; and an document classification process section that classifies the documents (the image data) based on the assigned identifier, wherein when the new identifier is assigned to the documents being successively read (the image data being successively input), the storage stores the feature vectors of the images of the documents (the image data) classified by the new identifier, and the new identifier.

There is provided an image processing apparatus according to an aspect, wherein when the number of stored identifiers reaches a predetermined number, of the stored identifiers, the identifier of the document corresponding to the image (or the image data) with the largest number of votes obtained by the voting is assigned to the documents being successively read (the image data being successively input).

According to the aspect, when the number of stored identifiers reaches the predetermined number, of the stored identifiers, the identifier of the document corresponding to the image with the largest number of votes obtained by the voting is assigned to the documents being successively read. Thereby, the documents are classified within the range of the predetermined classification number.

There is provided an image processing apparatus, further comprising a similarity calculator that calculates an image (or image data) similarity based on the number of votes obtained by the voting by the vote process section, wherein the number of stored identifiers does not reach a predetermined number, the identifier assignment process section assigns the stored identifier or assigns the new identifier to the documents being successively read (the image data being successively input), based on the image (or image data) similarity calculated by the similarity calculator.

There is provided an image processing apparatus according to an aspect, wherein when the number of stored identifiers reaches the predetermined number, the identifier assignment process section assigns the stored identifier to the documents being successively read (the image data being successively input) or classifies the documents being successively read (the image data being successively input) as nonsimilar, based on the image (or image data) similarity calculated by the similarity calculator.

There is provided an document reading apparatus, according to an aspect, for reading an document, comprising:

the above-described image processing apparatus; and a paper delivery section that delivers the documents classified by the identifier stored in the storage of the image processing apparatus, in a classified condition.

According to the aspect, the paper delivery section delivers the documents in a condition of being classified in the decided categories.

There is provided an document reading apparatus, according to an aspect, for reading an document, comprising:

the above-described image processing apparatus;

a paper delivery section that delivers the documents classified by the identifier stored by the storage of the image processing apparatus, in a classified condition; and a conveyer that conveys the documents classified as nonsimilar, to reread the documents, wherein when the documents are reread, the storage erases the stored feature vectors and the stored identifier.

According to the aspect, the paper delivery section delivers the documents in a condition of being classified in the decided classifications, and the conveyer conveys the documents classified as nonsimilar, to reread the documents. When the documents are reread, the stored feature vectors and identifier are erased. Thereby, the feature vectors and the identifier related to the already classified document are initialized. By rereading the documents classified as nonsimilar, the feature vectors of the document being read first and the identifier assigned for classifying the document are stored, and the previously assigned identifier is assigned or a new identifier is assigned to the documents being successively read thereafter based on the number of votes.

There is provided an document reading apparatus according to an aspect, wherein an document delivery position is changed according to the classification.

According to the aspect, the paper delivery section changes the document delivery position according to the classification.

There is provided an document reading apparatus according to an aspect, further comprising an delivery tray into which the documents are delivered, wherein the paper delivery section delivers the documents into different delivery trays according to the classification.

According to the aspect, the paper delivery section delivers the documents into different delivery trays according to the classification.

There is provided an document reading apparatus according to an aspect, comprising:

a storage that stores a plurality of feature vectors of images of documents and an identifier assigned for classifying the documents;

a voter that votes, when it is determined that the plurality of feature vectors extracted based on the images of the documents being successively read match with the feature vectors of the image of the document classified by the stored identifier, the image from which the matching feature vector is extracted for each matching feature vector;

an identifier assigner that assigns the stored identifier to the documents being successively read, based on the number of votes obtained by the voting by the voter; and a paper delivery section that delivers the documents in a condition of being classified according to the identifier assigned by the identifier assigner.

According to the aspect, it is determined whether or not the feature vectors of the images of the documents being successively read match with the feature vectors of the image of the document classified by the stored identifier. When it is determined that the feature vectors match, for each matching feature vector, the image from which the feature vector is extracted is voted, and based on the number of votes obtained by the voting, whether or not the stored identifier is assigned to the documents being successively read is determined. The paper delivery section delivers the documents in a condition of being classified in the decided classifications.

There is provided an image forming apparatus according to an aspect, comprising: the above-described document reading apparatus; and an image former for forming an output image based on the image obtained by reading the document by the document reading apparatus.

There is provided a computer-readable storage medium, according to an aspect, storing a computer-executable computer program for causing a computer to extract a plurality of feature vectors of each of images obtained by successively reading a plurality of documents (or the image data being input) and perform processing to classify the documents (or the image data) based on the extracted feature vectors, the computer program comprising:

causing the computer to extract the feature vectors of the image of the document being read first (or the image data being read first);

causing the computer to assign an identifier to the document (or the image data) for classifying the document (or the image data) based on the extracted feature vectors;

causing the computer to determine whether or not the feature vectors of the images of the documents being successively read (or the image data being successively input) subsequently to the document being read first (or the image data being input first) match with the feature vectors of the image of the document (the image data) classified by a stored identifier;

causing the computer to vote, when it is determined that the feature vectors match, the image from which the matching feature vectors are extracted; and causing the computer to assign the identifier to the documents being successively read: (the image data being successively input) or assign a new identifier to the documents being successively read (the image data being successively input), based on the number of votes obtained by the voting.

There is provided a recording medium according to an aspect, wherein the computer program further comprises:

causing the computer to calculate an image (image data) similarity based on the number of votes obtained by the voting; and causing the computer to assign the identifier to the documents being successively read (the image data being successively input) or assign a new identifier to the documents being successively read (the image data being successively input), based on the calculated image (image data) similarity when the number of identifiers does not reach a predetermined number.

There is provided a recording medium according to an aspect, wherein the computer program further comprises causing the computer to assign the identifier to the documents being successively read (the image data being successively input) or classify the documents being successively read (the image data being successively input) as nonsimilar, based on the calculated image (or image data) similarity when the number of identifiers reaches the predetermined number.

There is provided a recording medium according to an aspect, wherein when an document (image data) classified as nonsimilar is present, the computer program further comprises causing the computer to repeat at least once the steps: causing the computer to extract; causing the computer to assign; causing the computer to determine; causing the computer to vote; and causing the computer to assign.

BRIEF DESCRIPTION OF DRAWINGS

FIG. 4 is an explanatory view showing an example of a feature point of a connected area;

FIGS. 7A to 7C are explanatory views showing examples of invariant calculation based on an current feature point;

FIGS. 8A to 8C are explanatory views showing examples of invariant calculation based on an current feature point;

FIGS. 11A and 11B are explanatory views showing the structure of a hash table;

FIG. 12 is an explanatory view showing the structure of a category table;

FIGS. 13A and 13B are explanatory views showing an example of the hash table and the category table when the first document is read;

FIGS. 14A to 14C are explanatory views showing an example of the hash table, the number of votes and the category table when the second document is read;

DETAILED DESCRIPTION

First Embodiment

Figure 1:
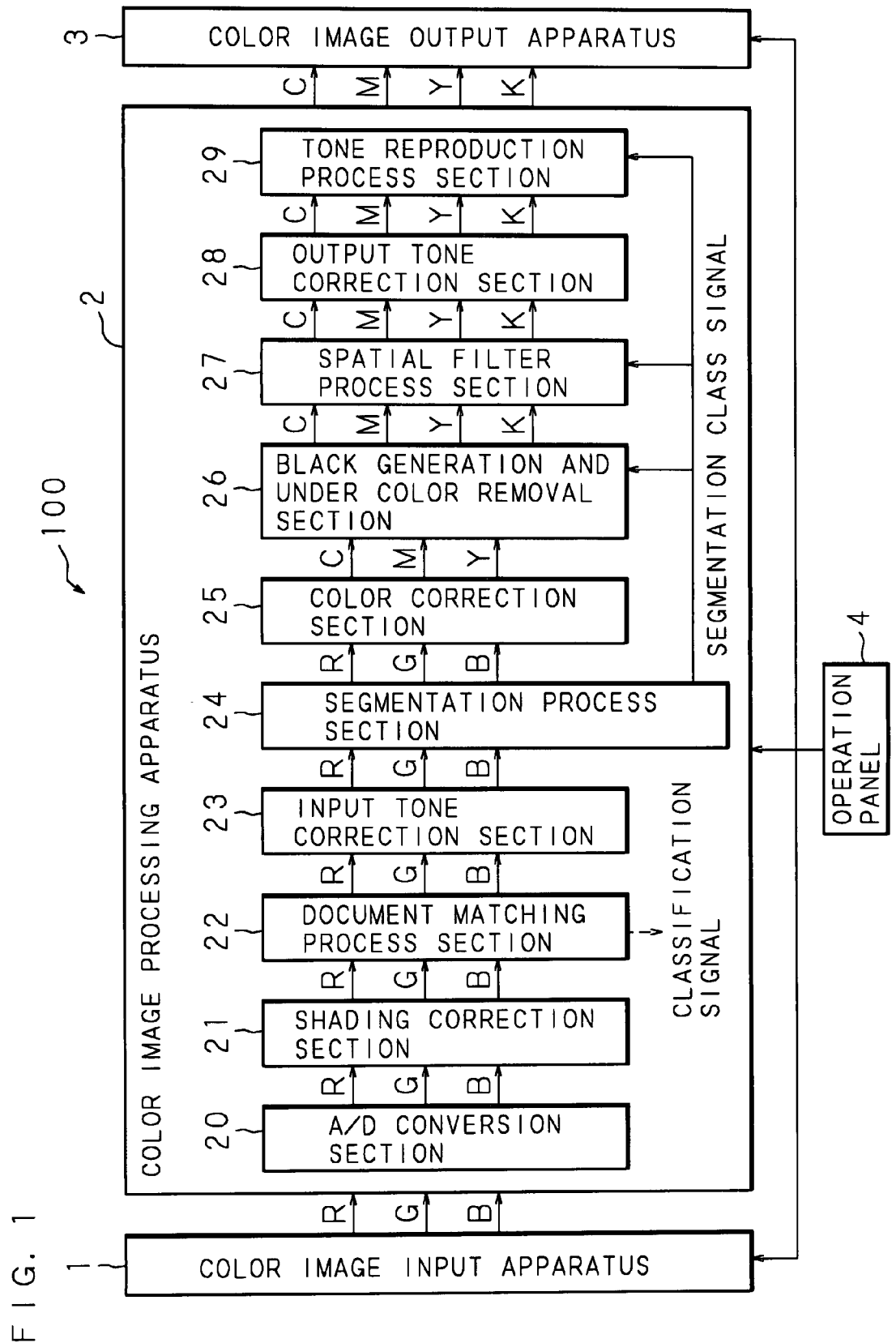
FIG. 1 is a block diagram showing the structure of an image forming apparatus having an image processing apparatus according to the present invention.

Hereinafter, the present invention will be described based on the drawings showing embodiments. FIG. 1 is a block diagram showing the structure of an image forming apparatus 100 having an image processing apparatus according to the present invention. The image forming apparatus 100 (for example, a digital color copier, or a multi-function apparatus having multiple functions, a printer function and a facsimile and electronic mail delivery function) includes a color image input apparatus 1, a color image processing apparatus 2 (image processing apparatus), a color image output apparatus 3 as the image forming means, and an operation panel 4 for performing various operations. The image data of an analog signal of RGB (R: red, G: green, and B: blue) obtained by reading the document by the color image input apparatus 1 is outputted to the color image processing apparatus 2, undergoes predetermined processing at the color image processing apparatus 2, and is outputted to the color image output apparatus 3 as a digital color signal of CMYK (C: cyan, M: magenta, Y: yellow, and K: black).

The color image input apparatus 1, which is, for example, a scanner having a charge coupled device (CCD), reads the reflected light image from the document image as an analog RGB signal, and outputs the RGB signal being read, to the color image processing apparatus 2. The color image output apparatus 3 is image forming means using the electrophotographic method or the inkjet method for outputting the image data of the document image onto recording paper. The color image output apparatus 3 may be a display apparatus.

The color image processing apparatus 2 has process sections described later, and is constituted by an application specific integrated circuit (ASIC) or the like.

An A/D conversion section 20 converts the RGB signal inputted from the color image input apparatus 1, into a digital signal of, for example, 10 bits, and outputs the converted RGB signal to a shading correction section 21.

The shading correction section 21 performs, on the input RGB signal, the compensation processing to remove various distortions caused at the illumination system, the image focusing system, the image sensing system and the like of the color image input apparatus 1. The shading correction section 21 also performs the processing to convert the input RGB signal into a signal that is easy to process by the image processing system adopted by the color image processing apparatus 2 such as a density signal and the processing to adjust the color balance, and outputs the compensated RGB signal to a document matching process section 22.

The document matching process section 22 binarizes the input image, calculates the feature points (for example, the centroid) of the connected area identified based on the binary image, selects a plurality of feature points from among the calculated feature vectors, and calculates the feature vector (for example, the hash value) as the invariant based on the selected feature points. The document matching process section 22 determines whether the image is similar or not based on the calculated feature vector, classifies the documents corresponding to the similar image into one category, and outputs a classification signal. The document matching process section 22 also outputs the input RGB signal to a succeeding input tone correction section 23 without performing any processing thereon.

The input tone correction section 23 performs, on the RGB signal, image quality adjustment processing such as the elimination of the background density or contrast, and outputs the processed RGB signal to an segmentation process section 24.

The segmentation process section 24 separates each pixel of the input image by determining whether it belongs the text area, the halftone dot area or the photograph area (continuous tone area) based on the input RGB signal. Based on the result of the segmentation, the segmentation process section 24 outputs an segmentation class signal representing to which area each pixel belongs, to a black generation and under color removal section 26, a spatial filter process section 27 and a tone reproduction process section 29. The segmentation process section 24 also outputs the input RGB signal to a succeeding color correction section 25 without performing any processing thereon.

The color correction section 25 converts the input RGB signal into a CMY color space, performs color correction in accordance with the characteristic of the color image output apparatus 3, and outputs the corrected CMY signal to the black generation and under color removal section 26. Specifically, for fidelity of color reproduction, the color correction section 25 performs the processing to remove color inaccuracy based on the spectral characteristic of the CMY coloring material containing an unnecessary absorbing component.

The black generation and under color removal section 26 generates a K (black) signal based on the CMY signal inputted from the color correction section 25, generates a new CMY signal by subtracting the K signal from the input CMY signal, and outputs the generated CMYK signal to the spatial filter process section 27.

An example of the processing at the black generation and under color removal section 26 will be shown. For example, in the case of the processing to perform the black generation using skeleton black, when the input/output characteristic of the skeleton curve is y=f(x), the input signals are C, M and Y, the output signals are C', M', Y' and K', and the under color removal (UCR) ratio is $\alpha(0<\alpha<1)$, the outputted signals by the black generation under color removal processing are expressed by K'=f{min(C, M, Y)}, C'=C−αK', M'=M−αK', and Y'=Y−αK'.

The spatial filter process section 27 performs the spatial filter processing using a digital filter based on the segmentation class signal, on the CMYK signal inputted from the black generation and under color removal section 26. Thereby, the spatial frequency characteristic of the image data is corrected, thereby preventing blurring of the output image or graininess deterioration in the color image output apparatus 3. For example, the spatial filter process section 27 performs edge enhancement processing, particularly to improve the reproducibility of black texts or color texts, on the area separated into the text area at the segmentation process section 24, thereby enhancing the high-frequency components. The spatial filter process section 27 performs low-pass filter processing to remove the input halftone dot component, on the area separated into the halftone dot area at the segmentation process section 24. The spatial filter process section 27 outputs the processed CMYK signal to an output tone correction section 28.

The output tone correction section 28 performs, on the CMYK signal inputted from the spatial filter process section 27, output tone correction processing to perform conversion into the halftone dot area ratio which is a characteristic value of the color image output apparatus 3, and outputs the output-tone-corrected CMYK signal to a tone reproduction process section 29.

The tone reproduction process section 29 performs predetermined processing on the CMYK signal inputted from the output tone correction section 28, based on the segmentation class signal inputted from the segmentation process section 24. For example, the tone reproduction process section 29 performs, particularly to improve the reproducibility of black texts or color texts, binarization processing or multi-level dithering processing on the area separated into the text area so that the area is suitable for the reproduction of the high-frequency components in the color image output apparatus 3.

The tone reproduction process section 29 also performs tone reproduction processing (halftone generation), on the area separated into the halftone dot area at the area separation processing 24, so that the image is separated into pixels in the end and the tones thereof can be reproduced. Further, the tone reproduction process section 29 performs binarization processing or multi-level dithering processing, on the area separated into the photograph area at the segmentation process section 24, so that the area is suitable for the tone reproducibility in the color image output apparatus 3.

The color image processing apparatus 2 temporarily stores the image data (CMYK signal) processed by the tone reproduction process section 29 in the storage (not shown), reads the image data stored in the storage at a predetermined time when image formation is performed, and outputs the image data being read, to the color image output apparatus 3. These controls are performed, for example, by a CPU (not shown).

Figure 2:
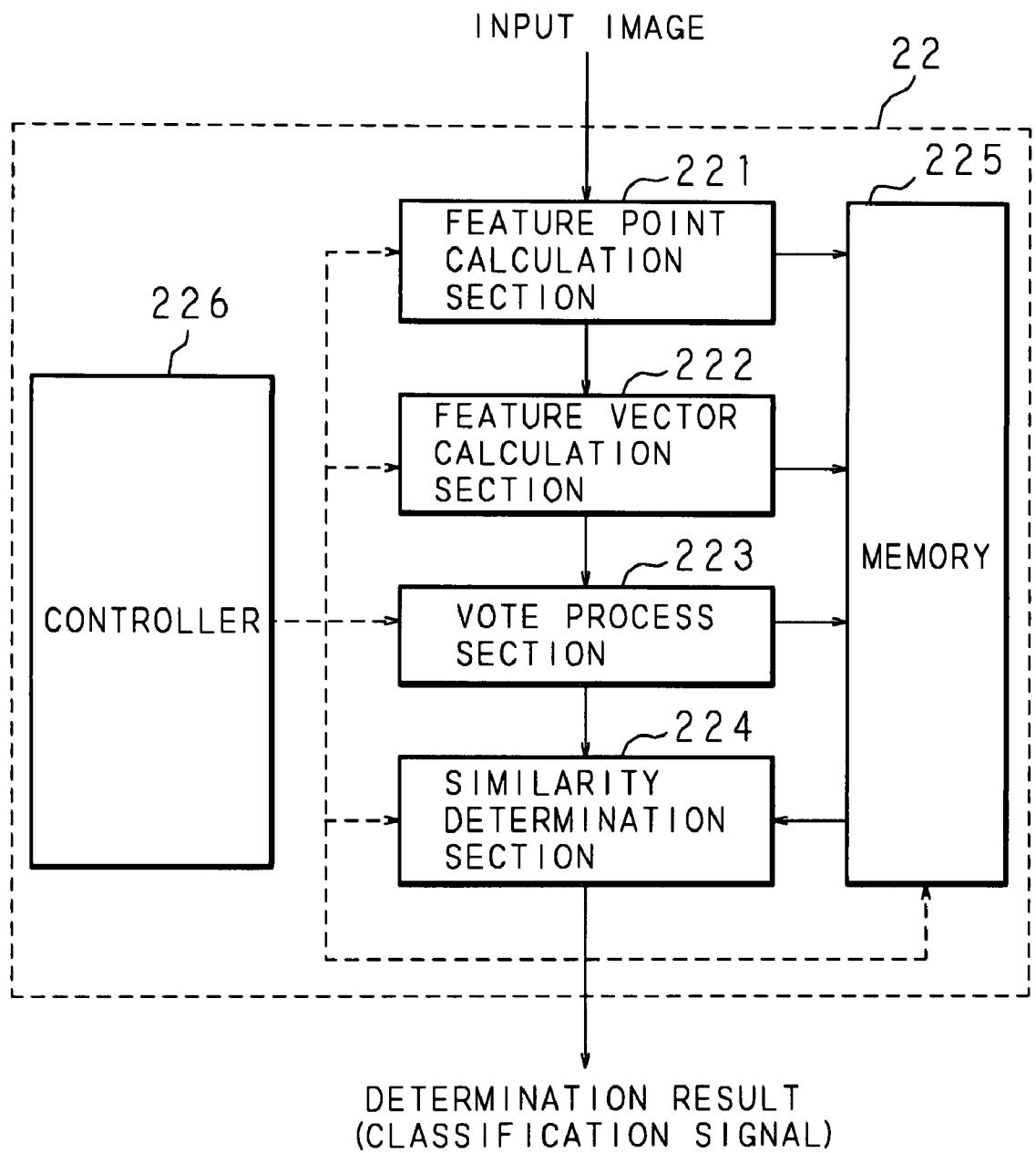
FIG. 2 is a block diagram showing the structure of a document matching process section.

FIG. 2 is a block diagram showing the structure of the document matching process section 22. The document matching process section 22 includes a feature point calculator 221, a feature vector calculator 222, a vote process section 223, a similarity determination process section 224, a memory 225, and a controller 226 controlling these elements.

The feature point calculator 221 performs subsequently-described predetermined processing on the input image, binarizes the input image, extracts (calculates) the feature points of the connected area identified based on the binary image (for example, a value obtained by cumulatively adding the coordinate values, in the binary image, of the pixels constituting the connected area and dividing the cumulatively added coordinate values by the number of pixels included in the connected area), and outputs the extracted feature points to the feature vector calculator 222.

Figure 3:
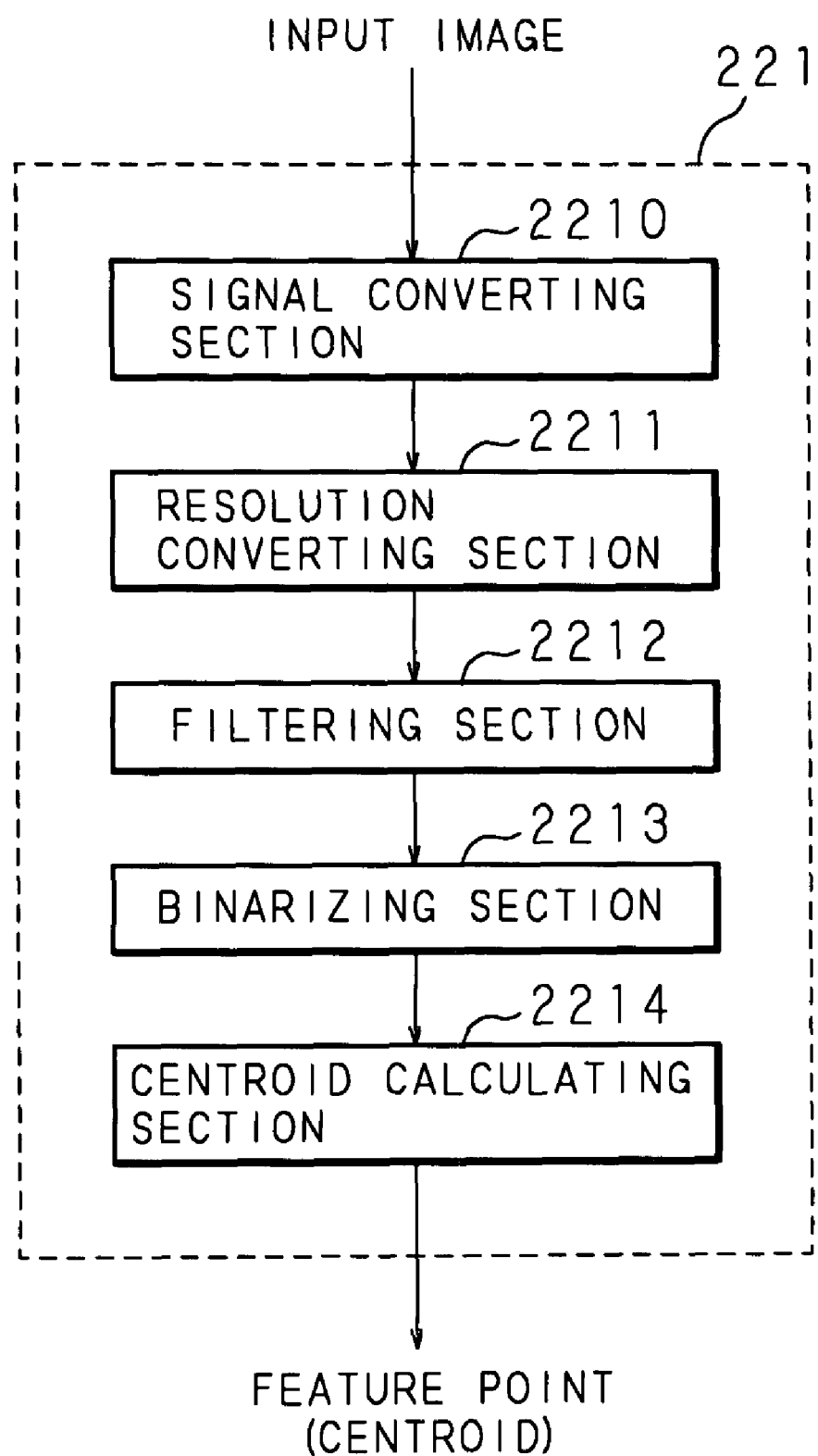
FIG. 3 is a block diagram showing the structure of a feature point calculator.

FIG. 3 is a block diagram showing the structure of the feature point calculator 221. The feature point calculator 221 includes a signal converting section 2210, a resolution converting section 2211, a filtering section 2212, a binarizing section 2213, and a centroid calculating section 2214.

When the input image is a color image, the signal converting section 2210 achromatizes the color image to be converted into a brightness signal or a lightness signal, and outputs the converted image to the resolution converting section 2211. For example, the brightness signal Y can be expressed as $Yj=0.30 \times Rj+0.59 \times Gj+0.11 \times Bj$ where Rj, Gj and Bj are the color components of the pixels R, G and B, respectively, and Yj is the brightness signals of the pixels. The present invention is not limited to this expression. The RGB signal may be converted into a CIE1976L*a*b signal.

The resolution converting section 2211 again changes the magnification of the input image so that the resolution is a predetermined value even when the magnification of the input image is optically changed by the color image input apparatus 1, and outputs the magnification-changed image to the filtering section 2212. By doing this, even when the resolution is changed because the magnification is changed by the color image input apparatus 1, the feature points can be extracted without affected by the magnification change, so that the document can be accurately classified. In particular, it can be prevented that in the case of reduced texts, when the connected area is identified by performing binarization, areas documently separated from each other are identified as being concatenated because of blurred texts and the calculated centroid is shifted. The resolution converting section 2211 also converts the resolution into a resolution lower than that read at unity magnification by the color image input apparatus 1. For example, an image read at 600 dots per inch (dpi) by the color image input apparatus 1 is converted into an image of 300 dpi. By doing this, the amount of processing in the succeeding stages can be reduced.

The filtering section 2212 corrects the spatial frequency characteristic of the input image (for example, edge enhancement processing and smoothing processing), and outputs the corrected image to the binarizing section 2213. Since the spatial frequency characteristic of the color image input apparatus 1 varies among models, the filtering section 2212 corrects the different spatial frequency characteristic to a required one. In the images (for example, image signals) outputted by the color image input apparatus 1, deteriorations such as image blurring occur because of optical system parts such as a lens and a mirror, the aperture of the light receiving surface of the CCD, transfer efficiency, afterimages, the integral effect and scanning nonuniformity by physical scanning, and the like. The filtering section 2212 recovers the deterioration such as blurring caused in the image, by performing boundary or edge enhancement processing. The filter processing 2212 also performs smoothing processing to suppress the high-frequency components unnecessary for the feature point extraction processing performed in the succeeding stage. By doing this, the feature points can be accurately extracted, so that the image similarity can be accurately determined. The filter coefficient used by the filtering section 2212 can be appropriately set according to the model or the characteristic of the color image input apparatus 1 used.

The binarizing section 2213 binarizes the image by comparing the brightness value (brightness signal) or the lightness value (lightness signal) of the input image with a threshold value, and outputs the obtained binary image to the centroid calculating section 2214.

The centroid calculating section 2214 performs labeling (label assigning processing) on each pixel based on the binarization information (for example, expressed by "1" and "0") of each pixel of the binary image inputted from the binarizing section 2213, identifies a connected area where pixels to which the same label is assigned are concatenated, extracts the centroid of the identified connected area as a feature point, and outputs the extracted feature point to the feature vector calculator 222. The feature point can be expressed by coordinate values (x coordinate, y coordinate) in the binary image.

FIG. 4 is an explanatory view showing an example of the feature point of the connected area. In the figure, the identified connected area is a text "A", and is identified as a set of pixels to which the same label is assigned. The feature point (centroid) of the text "A" is the position (x-coordinate, y-coordinate) indicated by the black circle in the figure.

Figure 5:
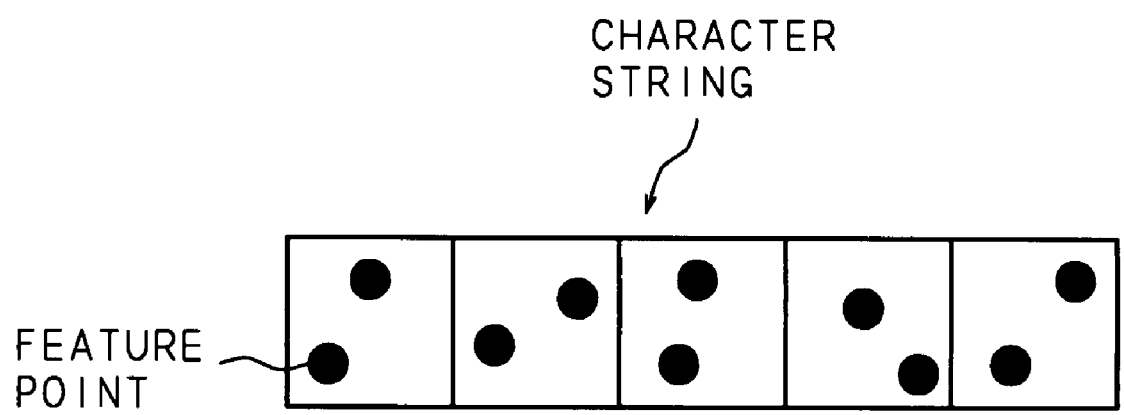
FIG. 5 is an explanatory view showing an example of the result of feature point extraction for a character string.

FIG. 5 is an explanatory view showing an example of the result of feature point extraction for a character string. In the case of a character string including a plurality of texts, a plurality of feature points having different coordinates according to the kind of the texts are extracted.

The feature vector calculator 222 sets each feature point inputted from the feature point calculator 221 (that is, the coordinate values of the centroid of the connected area) as an current feature point, and extracts, for example, surrounding four other feature points at short distances from the current feature point.

Figure 6:
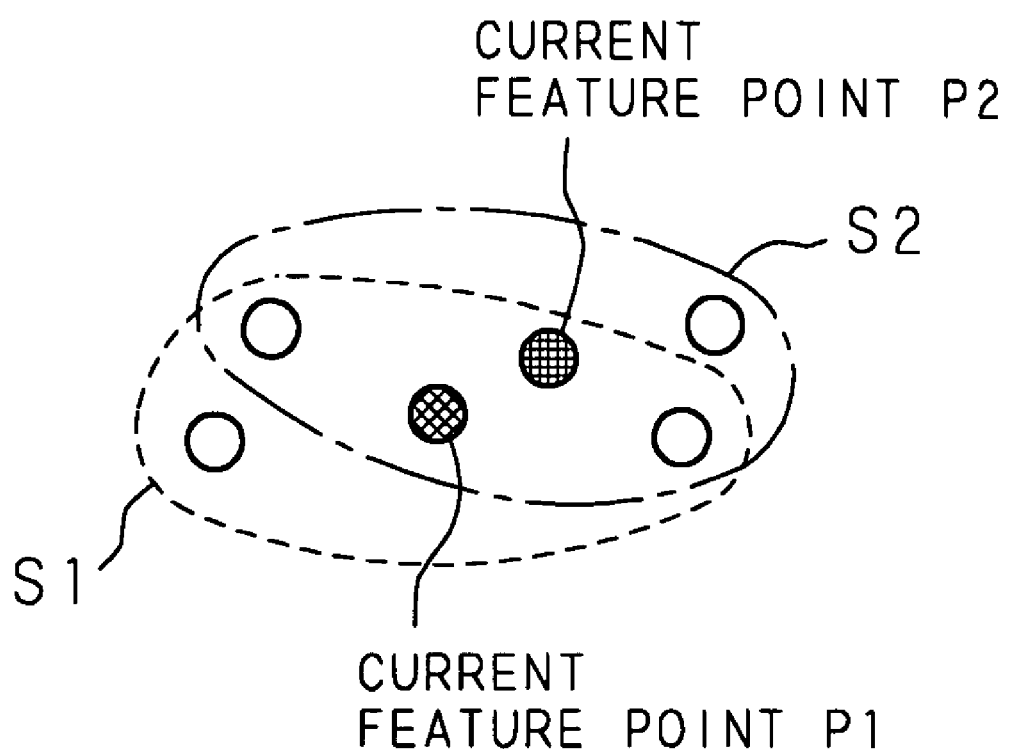
FIG. 6 is an explanatory view showing an current feature point and surrounding feature points.

FIG. 6 is an explanatory view showing the current feature point and the surrounding feature points. As shown in FIG. 6, for the current feature point P1, for example, four feature points surrounded by the closed curve S1 are extracted (for the current feature point P1, the current feature point P2 is also extracted as one feature point). For the current feature point P2, for example, four feature points surrounded by the closed curve S2 are extracted (for the current feature point P2, the current feature point P1 is also extracted as one feature point).

The feature vector calculator 222 selects three feature points from among the extracted four feature points, and calculates the variant. The number of feature points to be selected is not limited to three. It may be four, five, etc. The number of feature points to be selected differs according to the kind of the feature vector to be obtained. For example, the invariant obtained from three points is a similarity invariant.

FIGS. 7A to 7C are explanatory views showing examples of the invariant calculation based on the current feature point P1. FIGS. 8A to 8C are explanatory views showing examples of the invariant calculation based on the current feature point P2. As shown in FIGS. 7A to 7C, three feature points, which are nearest to the current feature point P1, are selected from among the four feature points surrounding the current feature point P1, and the three invariants are designated H1$j$(j=1, 2 and 3). The invariant H1$j$ is calculated by an expression H1$j$=A1$j$/B1$j$. Here, A1$j$ and B1$j$ are the distances between the feature points. The distance is calculated based on the coordinate values of respective surrounding feature points. By doing this, for example, even when, the document is rotated, moved or inclined, the invariant H1$j$ is not changed, and the image similarity can be accurately determined, so that similar documents can be accurately classified.

Likewise, as shown in FIGS. 8A to 8C, three feature points are selected from among the four feature points surrounding the current feature point P2, and the three invariants are designated H2$j$(j=1, 2 and 3). The invariant H2$j$ is calculated by an expression H2$j$=A2$j$/B2$j$. Here, A2$j$ and B2$j$ are the distances between the feature points. As described above, the distance is calculated based on the coordinate values of respective surrounding feature points. In a similar manner, the invariant can be calculated for the other current feature points.

The feature vector calculator 222 calculates a hash value (feature vector) Hi based on the invariant calculated based on each current feature point. The hash value Hi of the current feature point Pi is expressed by Hi=(Hi1×10$^2$+Hi2×10$^1$+Hi3×10$^0$)/E. Here, E is a constant determined according to the value of the remainder being set. For example, when E is "10", the remainder is "0" to "9", and this is the range of the value that the calculated hash value can take. Moreover, i is a natural number and the number of the feature points. A couple of exemplary methods for calculating the invariant amounts from the current feature points are described below. Referring to FIGS. 9A to 9D, four combinations of any selected three from among the surrounding feature points P1, P2, P4 and P5 of the current feature point P3 may afford respective invariants H3$j$(j=1, 2, 3 and 4) based on H3$j$=A3$j$/B3$j$ same as described above. Also, referring to FIGS. 10A to 10D, four combinations of any selected three from among the surrounding feature points P2, P3, P5 and P6 of the current feature point P4 may afford respective invariants H4$j$(j=1, 2, 3 and 4) based on H4$j$=A4$j$/B4$j$ as described above. In these cases, the hash value Hi is expressed by Hi=(Hi1×10$^3$+Hi2×10$^2$+Hi3×10$^1$+Hi4×10$^0$)/E. The hash value as the feature vector is merely an example. The feature vector is not limited thereto, and a different hash function may be used. While an example in which four feature points are extracted as the surrounding other feature points is described in the above, the number is not limited to four. For example, six points may be extracted. In this case, five feature points are extracted from among the six, and for each of the six ways of extracting the five points, three points are extracted from among the five points to thereby obtain the invariant and calculate the hash value.

When a plurality of documents are successively read, the feature vector calculator 222 performs, on the image obtained by reading the first document, the above-described processings to calculate the hash values, and registers the calculated hash values (for example, H1, H2, . . . ) and the index representing the document (for example, ID1) in the hash table.

The feature vector calculator 222 also performs, on the images of the documents successively read after the first document, the above-described processings in a similar manner to calculate the hash values, and when the documents are classified into a new category in the document classification processing (that is, the processing to classify the documents being successively read, into document categories) performed by the similarity determination process section 224, the indices representing the documents (for example, ID2, ID3, . . . ) are registered in the hash table.

By doing this, the hash table is initialized every time a plurality of documents are read, the hash values calculated based on the image of the document being read first and the index representing the document are registered in the hash table, and the hash table is successively updated based on the registered hash values and index representing the document. Consequently, it is unnecessary to store the hash values corresponding to the document format information of various documents in the hash table, so that the storage capacity can be reduced.

Figure 9B:
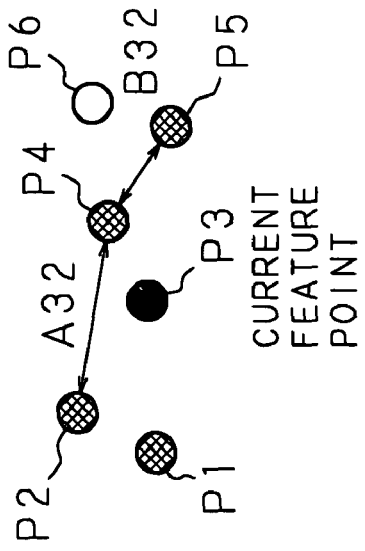
FIGS. 9A to 9D are explanatory views showing examples of invariant calculation based on an current feature point.
Figure 9D:
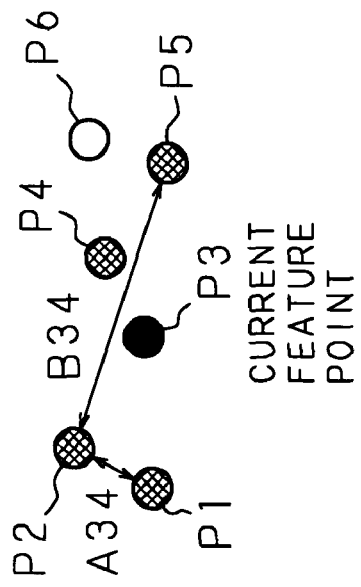
Figure 9A:
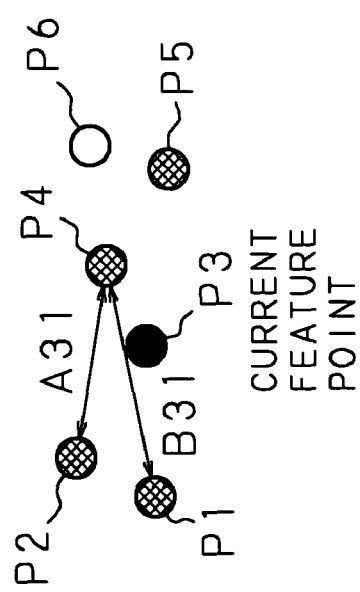
Figure 9C:
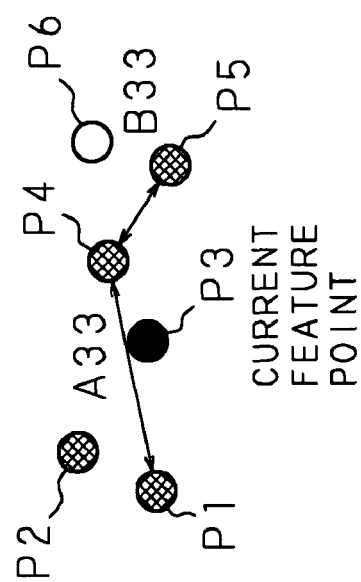
Figure 10B:
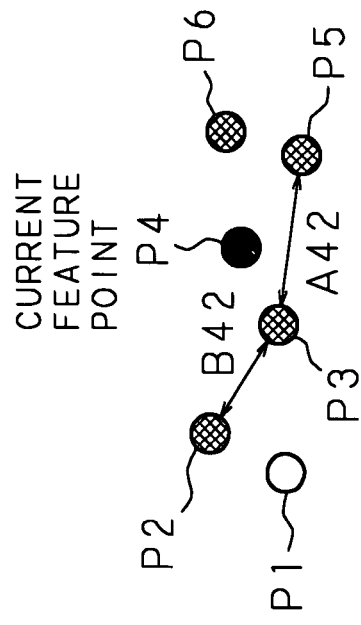
FIGS. 10A to 10D are explanatory views showing examples of invariant calculation based on an current feature point.
Figure 10D:
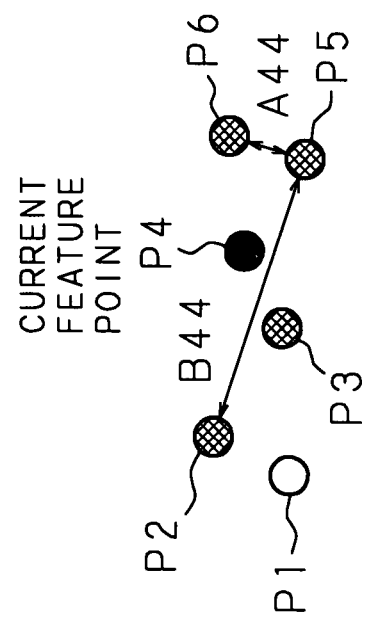
Figure 10A:
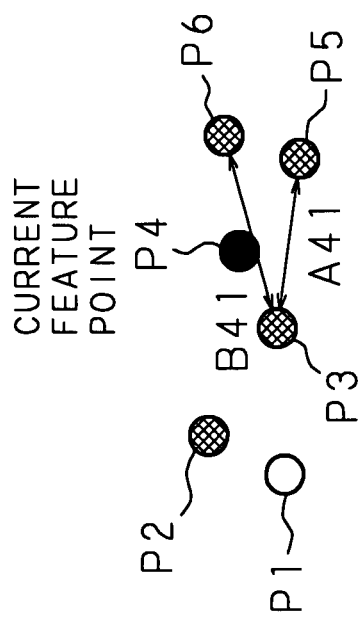
Figure 10C:
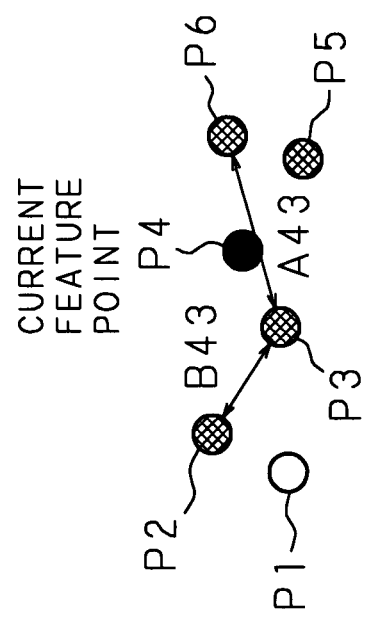

FIGS. 11A and 11B are explanatory views showing the structure of the hash table. As shown in the figures, the hash table includes the cells of the hash values and the indices representing the documents. More specifically, point indices representing the positions in the documents and the invariants (both are not shown) are registered so as to be associated with the indices representing the documents. To determine the image similarity, images, document images and the like to be collated are stored in the hash table. The hash table is stored in the memory 225. As shown in FIG. 9B, when the hash values are the same (H1=H5), two entries in the hash table may be integrated into one.

Every time a plurality of documents are read, the vote process section 223 searches the hash table stored in the memory 225 based on the hash values (feature vectors) calculated by the feature vector calculator 222 for the images of the documents successively read after the document being read first. When the hash values match, the vote process section 223 votes the indices representing the documents registered at the hash values (that is, the images for which the matching hash values are calculated). The result of the cumulative addition of the votes is outputted to the similarity determination process section 224 as the number of votes.

Every time a plurality of documents are read, the similarity determination process section 224 registers, in a category table, the largest number of votes obtained by multiplying the number of feature points extracted for the image of the document being read first and the hash values that can be calculated from one feature point (for example, M1), the index representing the document (for example, ID1), and the category of the document (for example, C1).

Every time a plurality of documents are read, the similarity determination process section 224 determines the similarity of the document (an image or a document image) based on the result of voting inputted from the vote process section 223, for the images of the documents successively read after the document being read first, and outputs the result of the determination (classification signal). More specifically, the similarity determination process section 224 calculates the similarity normalized by dividing the number of votes inputted from the vote process section 223, by the largest number of votes of each document, and compares the calculated similarity with a predetermined threshold value (for example, 0.8). When the similarity is equal to or higher than the threshold value, the similarity determination process section 224 determines that the image is similar to the image of the document for which the similarity is calculated, and classifies the image into the category of the document (that is, assigns the category of the document).

Moreover, every time a plurality of documents are read, the similarity determination process section 224 compares the calculated similarity with a predetermined threshold value (for example, 0.8) for the images of the documents successively read after the document being read first. When the similarity is lower than the threshold value, the similarity determination process section 224 determines that the image is not similar to the image of the document registered in the category table, and registers the index representing the document (for example, ID2, ID3, ... ), the largest number of votes (for example, M2, M3, ... ), and a new category in the category table.

By doing this, the category table is initialized every time a plurality of documents are read, the largest number of votes calculated based on the image of the document being read first, the index representing the document, and the category of the document are registered in the category table, and when the documents successively read after the document being read first are classified in a new category, the largest number of votes, the index representing the document, and the category of the document (newly provided category) are added.

FIG. 12 is an explanatory view showing the structure of the category table. As shown in the figure, the category table includes the cells of the indices representing the documents, the largest numbers of votes and the categories.

As the number of categories of the documents, that is, the classification number S, the maximum value thereof (for example, 3, 4, ... ) is preset, and the user specifies the classification number S within the range of the maximum value on the operation panel 4.

When the number of categories is larger than the classification number S in the classification of an document, the similarity determination process section 224 classifies the document into the category of the document with the number of votes that is the largest of the number of votes inputted from the vote process section 223. By doing this, the documents being read can be classified within the range of the specification number S. In a case where the number of categories is larger than the classification number S, when the calculated similarity is lower than the threshold value, the similarity determination process section 224 can determine that the document is similar to none of the classified documents and classifies it as nonsimilar. Thereby, by rereading the documents classified as nonsimilar, the documents similar to each other among the documents classified as nonsimilar once can be reclassified.

Based on the classification signal outputted from the similarity determination process section 224, the documents being successively read are classified into their respective categories and delivered. For example, when the documents are classified into three categories C1, C2 and C3, the documents being successively read are classified every time they are read, and the corresponding classification signal is outputted for each category, whereby the documents are delivered in a condition of being classified into three categories.

Next, the operation of the document matching process section 22 will be described. While a case where four documents are successively read will be described as an example, the number of documents is not limited thereto. While the classification number S is "3" in the following description, the classification number S is not limited thereto.

Figures 15A, 15B, 15C:
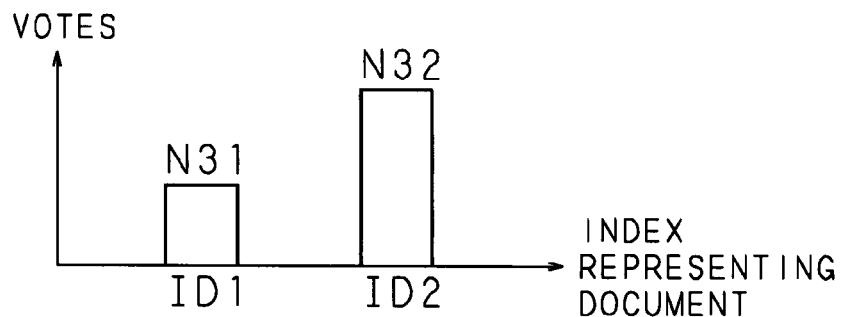
FIGS. 15A to 15C are explanatory views showing an example of the hash table, the number of votes and the category table when the third document is read.
Figure 16:
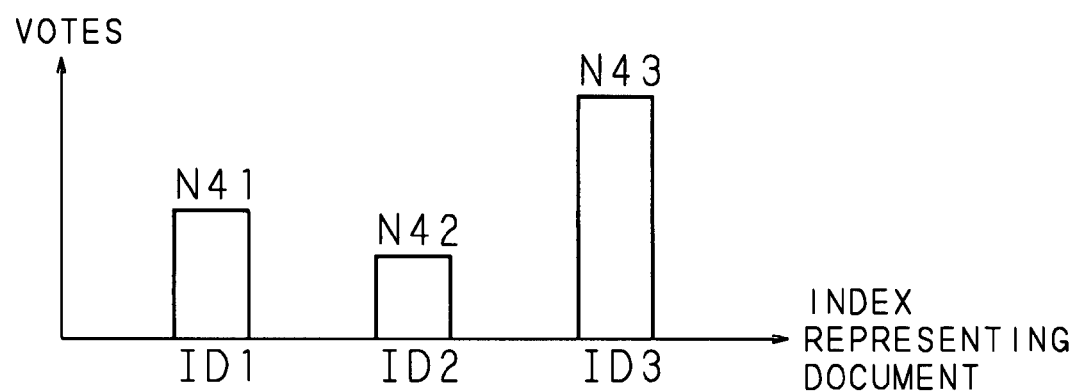
FIG. 16 is an explanatory view showing an example of the number of votes when the fourth document is read.

FIGS. 13A and 13B are explanatory views showing an example of the hash table and the category table when the first document is read. FIGS. 14A to 14C are explanatory views showing an example of the hash table, the number of votes and the category tables when the second document is read. FIGS. 15A to 15C are explanatory views showing an example of the hash table, the number of votes and the category tables when the third document is read. FIG. 16 is an explanatory view showing an example of the number of votes when the fourth document is read.

As shown in FIG. 11A, by reading the first document, the hash values (H1, H2, H3, ... ) and the index ID1 representing the document are registered in the hash table. In this case, the index ID1 representing the document is registered in the cells corresponding to the hash values (H1, H2, H3 and H5 in the figure), actually calculated based on the image of the first document (the index ID1 representing the document), of the hash values that can be calculated (H1, H2, H3, ... ).

As shown in FIG. 11B, by reading the first document, the index ID1 representing the document, the largest number of votes M1 and the category C1 are registered. The largest number of votes M1 is the product of the number of feature points extracted from the image of the document ID1 and the number of hash values that can be calculated from one feature point.

As shown in FIG. 12A, by reading the second document, the hash table is searched based on the hash values calculated based on the image obtained by the reading, when the hash values match, the document of the index (in this case, ID1) registered at the matching hash values is voted, and the result of the cumulative addition of the votes is calculated as the number of votes N21. In the number of votes Nk1, k represents the number, from the first document, of the document to be read, and 1 corresponds to the index ID1 representing the document registered in the hash table.

From the number of votes N21, the similarity R21 is calculated by R21=N21/M1, and it is determined whether or not the similarity R21 is equal to or higher than a predetermined threshold value (for example, 0.8). When the similarity R21 is lower than the threshold value, it is determined that the document being read is not similar to the category C1, and as shown in FIG. 12B, the index ID2 representing the document is updated in correspondence with the voted hash values. Moreover, as shown in FIG. 12C, a new category C2 is set, and the index ID2 representing the document, the largest number of votes M2 and the category C2 are registered in the category table.

When the similarity R21 is equal to or higher than the threshold value, it is determined that the document being read is similar to the category C1, and the document is classified into the category C1. In this case, registration in the hash table and the category table is not performed. In the explanation of FIGS. 14A to 14C, the second document is not similar to the first document.

As shown in FIG. 13A, by reading the third document, the hash table is searched based on the hash values calculated based on the image obtained by the reading, when the hash values match, the documents of the indices (in this case, ID1 and ID2) registered at the matching hash values are voted, and the results of the cumulative addition of the votes are calculated as the numbers of votes N31 and N32. In the number of votes Nk1, k represents the number, from the first document, of the document being read, and 1 corresponds to the index ID1 representing the document registered in the hash table.

From the number of votes N31, the similarity R31 is calculated by R31=N31/M1, from the number of votes N32, the similarity R32 is calculated by R32=N32/M1, and it is determined whether or not the similarities R31 and R32 are equal to or higher than a predetermined threshold value (for example, 0.8). When the similarities R31 and R32 are lower than the threshold value, it is determined that the document being read is similar to none of the categories C1 and C2, and as shown in FIG. 13B, the index ID3 representing the document is updated in correspondence with the voted hash values. Moreover, as shown in FIG. 13C, a new category C3 is set, and the index ID3 representing the document, the largest number of votes M3 and the category C3 are registered in the category table.

When one of the similarities R31 and R32 is equal to or higher than the threshold value, it is determined that the document being read is similar to the category C1 or C2, and the document is classified into the category C1 or C2. In this case, registration in the hash table and the category table is not performed. When both of the similarities R31 and R32 are equal to or higher than the threshold value, the higher similarity may be adopted. In the explanation of FIGS. 15A to 15C, the third document is similar to none of the documents classified earlier.

As shown in FIG. 16, by reading the fourth document, the hash table is searched based on the hash values calculated based on the image obtained by the reading, when the hash values match, the documents of the indices (in this case, ID1, ID2 and ID3) registered at the matching hash values are voted, and the results of the cumulative addition of the votes are calculated as the numbers of votes N41, N42 and N43. In this case, since the number of categories C1, C2 and C3 has already reached 3 which is the classification number S, the document being read is classified into the document ID3 for which the largest one (in this case, N43) of the calculated numbers of votes is calculated, that is, the category C3. By doing this, irrespective of the number of documents being read, the documents can be classified according to a predetermined classification number.

Figure 17:
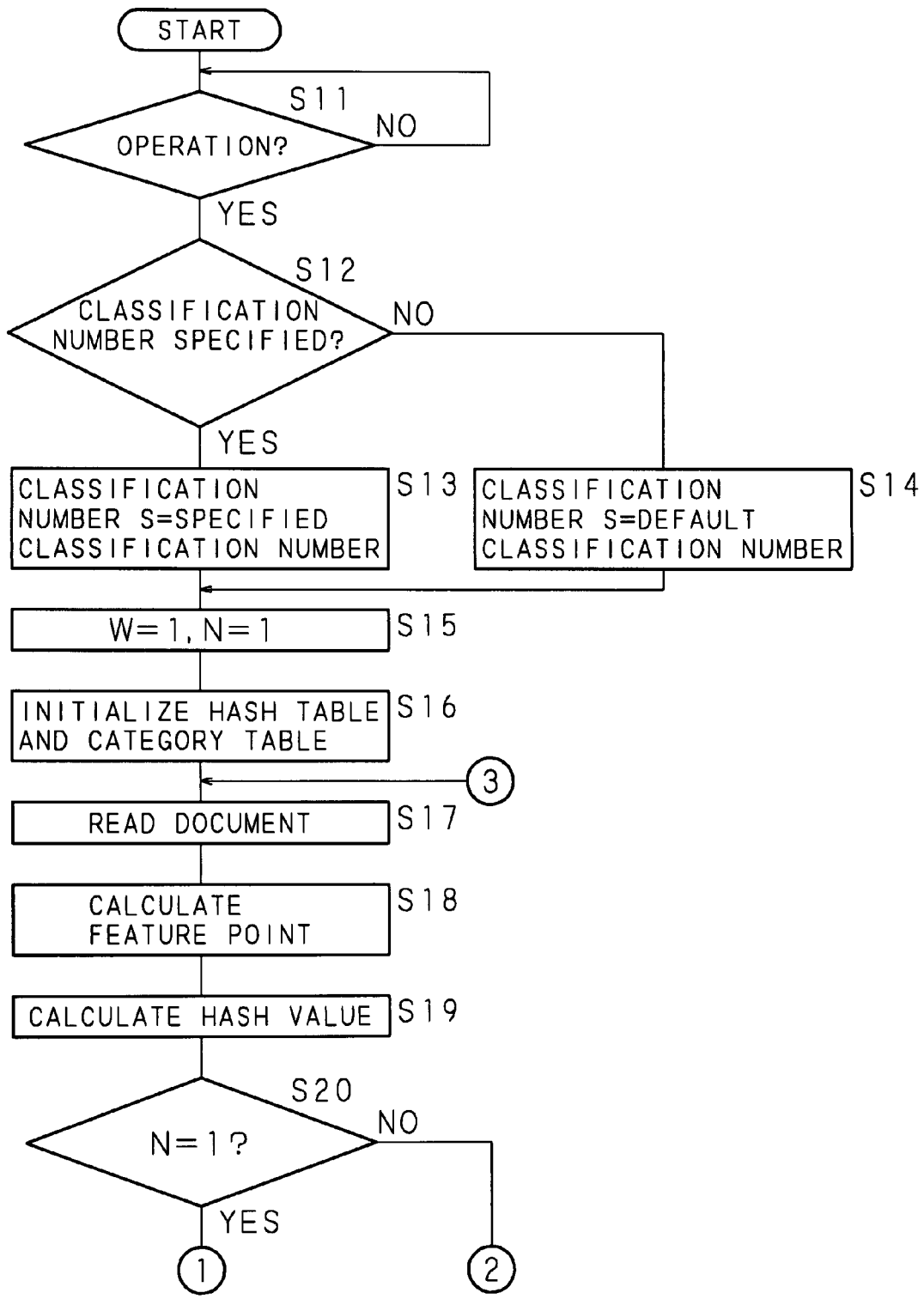
FIG. 17 is a flowchart showing the procedure of the document classification processing of a color image processing apparatus.

FIGS. 15 to 17 are flowcharts showing the procedure of the document classification processing of the color image processing apparatus 2 (hereinafter, referred to as processing unit). The document classification processing may be performed not only by hardware circuitry designed specifically therefor but also by loading a computer program defining the procedure of the document classification processing, into a personal computer including a CPU, a RAM and a ROM, and executing the computer program by the CPU.

The processing unit determines the presence or absence of an operation from the user (S11). When there is no operation (NO at S11), the processing unit continues the processing of step S11, and waits until there is an operation from the user. When there is an operation from the user (YES at S11), the processing unit determines whether the classification number is specified or not (S12).

When the classification number is specified (YES at S12), the processing unit sets the specified classification number as the classification number S (S13), and sets an index W representing the number of document categories to 1 and the number of times N representing the number of times of processing to 1 (S15). When the classification number is not specified (NO at S12), the processing unit sets the default classification number as the classification number S (S14), and continues the processing of step S15.

The processing unit initializes the hash table and the category table (S16), and reads the document (S17). The processing unit calculates the feature points based on the image obtained by reading the document (S18), and calculates the hash value (feature vector) based on the calculated feature points (S19). The processing unit determines whether N is 1 or not (S20). When determining that N is 1 (YES at S20), the processing unit registers the index representing the document in the hash table based on the calculated hash value (S21).

The processing unit registers the index representing the document, the largest number of votes and the category in the category table (S22), and determines whether all the documents have been read or not (S23). When all the documents have not been read (NO at S23), the processing unit adds 1 to the number of times N representing the number of times of processing (S24), sets the result as a new number of times of processing, and continues the processing of step 17 and succeeding steps.

When determining that N is not 1 at step S20 (NO at S20), the processing unit performs voting processing (S25), and calculates the similarity (S26). The processing unit determines whether W is equal to the classification number S or not (S27). When W is equal to the classification number S (YES at S27), the processing unit classifies the document being read, into the category of the document with the largest number of votes (S28), and continues the processing of step S23 and succeeding steps.

When W is not equal to the classification number S (NO at S27), the processing unit determines whether or not the calculated similarity is equal to or higher than the threshold value (S29). When the similarity is equal to or higher than the threshold value (YES at S29), the processing unit classifies the document being read, into the category of the document with a high similarity (S30), and continues the processing of step S23 and succeeding steps. When the similarity is not equal to or higher than the threshold value (NO at step S29), the processing unit adds 1 to W (S31), and continues the processing of step S21 and succeeding steps. When reading of all the documents is finished (YES at S23), the processing unit ends the processing.

Figure 20:
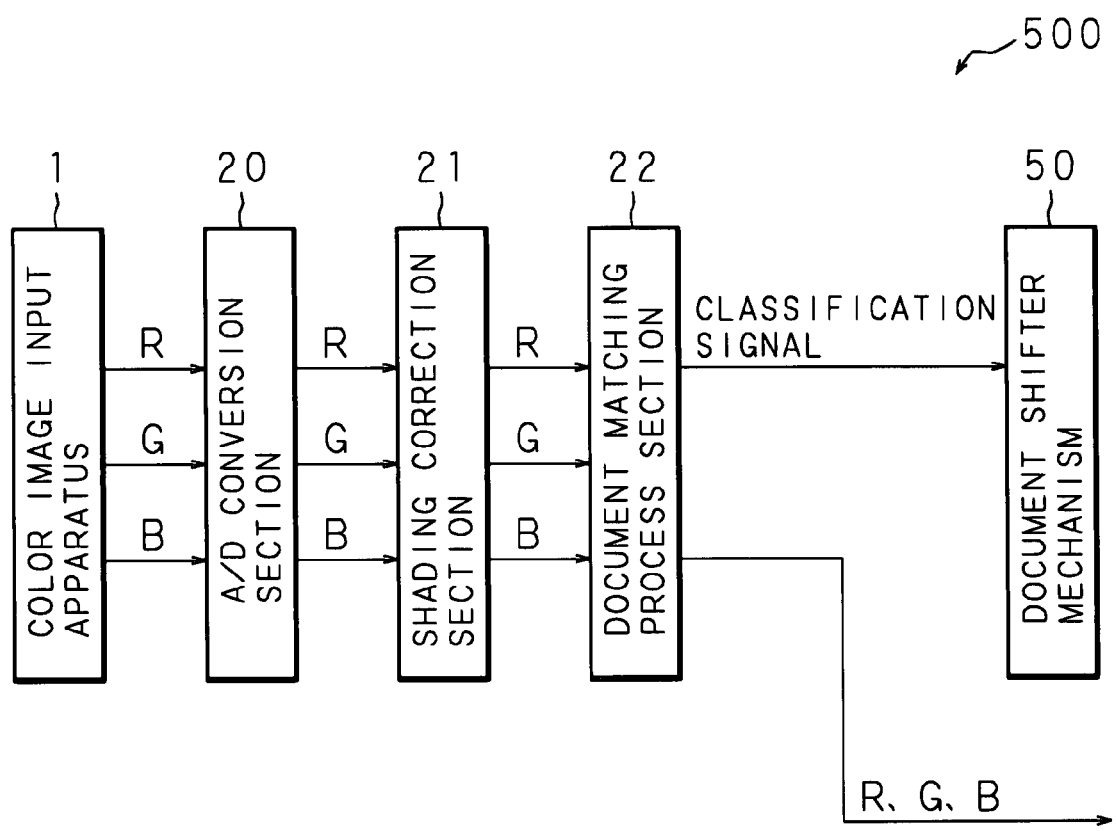
FIG. 20 is a block diagram showing the structure of an document reading apparatus according to the present invention.

FIG. 20 is a block diagram showing the structure of an document reading apparatus 500 according to the present invention. As shown in the figure, the document reading apparatus 500 includes the color image input apparatus 1, the A/D conversion section 20, the shading correction section 21, the document matching process section 22, and an document shifter mechanism 50. The color image input apparatus 1, the A/D conversion section 20, the shading correction section 21 and the document matching process section 22 are not described because they are similar to those of the above-described image forming apparatus 100.

The document shifter mechanism 50 obtains the classification signal outputted from the document matching process section 22, classifies the documents being successively read, according to the classification signal, and delivers the documents. Details will be given later.

Figure 21:
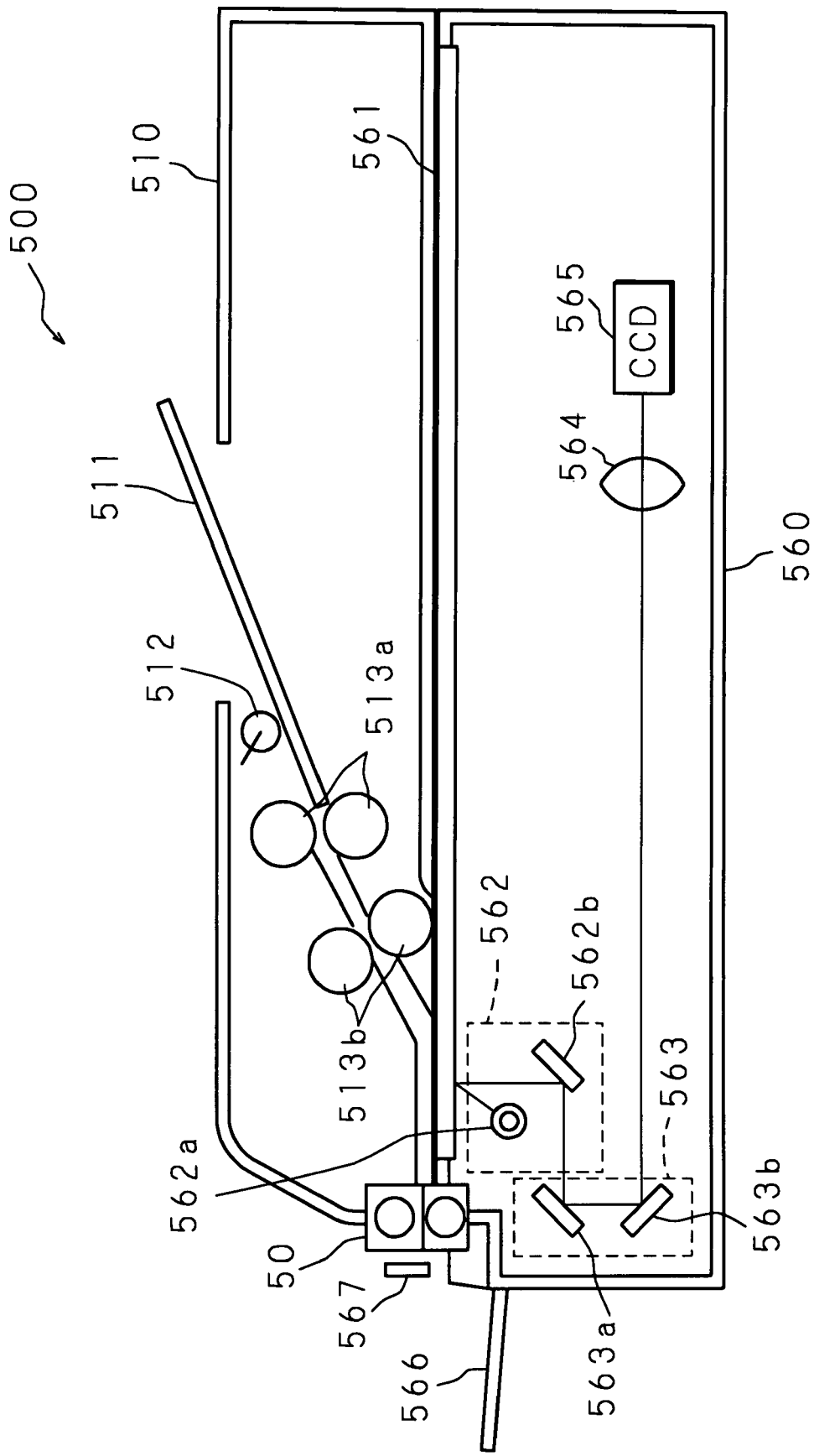
FIG. 21 is a schematic view showing the structure of the document reading apparatus according to the present invention.

FIG. 21 is a schematic view showing the structure of the document reading apparatus according to the present invention. The document reading apparatus 500 includes an document conveyance section constituted by an upper body 510 and a scanner section constituted by a lower body 560.

The upper body 510 includes: a leading roller 512 for conveying, one by one, the documents placed on an document tray 511; conveyance rollers 513a and 513b conveying the documents for reading the images on the documents; the document shifter mechanism 50 shifting the document delivery position with respect to the conveyance direction (delivery direction) for each document category based on the classification signal inputted from the document matching process section 22 when the documents are delivered; and an document delivery sensor 567 sensing the document to be delivered. The document shifter mechanism 50 is structured so as to be vertically separable into two parts.

The lower body 560 includes: scanning units 562 and 563 parallelly reciprocating along the lower surface of a placement stand 561; an image forming lens 564; a CCD line sensor 565 as a photoelectric conversion element; the document shifter mechanism 50; and an delivery tray 566. The scanning unit 562 includes: a light source 562a (for example, a halogen lamp) for emitting light to the document conveyed from the document tray 511 or the document placed on the placement stand 561; and a mirror 562b for directing the light reflected at the document to a predetermined optical path. The scanning unit 563 includes mirrors 563a and 563b for directing the light reflected at the document to a predetermined optical path.

The image forming lens 564 forms the reflected light directed from the scanning unit 563, into an image in a predetermined position on the CCD line sensor 565. The CCD line sensor 565 photoelectrically converts the formed light image, and outputs an electric signal. That is, the CCD line sensor 565 outputs, to the color image processing apparatus 2, data color-separated into color components of R, G and B based on the color image read from the document (for example, the surface of the document).

FIGS. 20 and 21 are transverse cross-sectional views showing the structure of the document shifter mechanism 50. The document shifter mechanism 50 includes bodies 51 and 52 that are vertically separable from each other and rectangular in transverse cross section. The body 51 is supported by the lower boy 560. The body 52 is supported by the upper body 510. The body 52 includes an offset member 60, a rotation driving source 65, a driving transmission member 70, an offset driving source 75 and an offset driving transmission member 80.

The offset member 60 is movable in a horizontal direction (in the figure, the Y direction, that is, a direction orthogonal to the document delivery direction), and includes: a body 61 that is disposed inside the body 52 and rectangular in transverse cross section; and offset rollers 62 that are an appropriate distance separated from each other along the direction of length of the body 61. The offset member 60 offset-delivers the documents (delivers the documents in a condition of being horizontally shifted according to the document category) by moving horizontally. The body 61 rotatably supports the offset rollers 62 so that the documents are delivered in the conveyance direction. When delivering the documents into the delivery tray 566, the offset rollers 62 chuck the documents.

The driving transmission member 70 includes: a driving gear 71 connected to the rotation driving source 65; a shaft 72 engaged with the center of the driving gear 71; a coupling gear 73a disposed on the shaft 72; a slide member 74; and a coupling gear 73b meshing with the coupling gear 73a. A rod-shaped support member 63 is fitted in the center of the coupling gear 73b, and the offset rollers 62 are fixed onto the support member 63 so as to be an appropriate distance separated from each other. By this structure, the driving force from the rotation driving source 65 is transmitted to the offset rollers 62.

The shaft 72 is supported so as to be rotatable in the horizontal direction, and the slide member 74 is slidable on the shaft 72. The shaft 72 is capable of moving the offset member 60 in a direction (horizontal direction) orthogonal to the document delivery (conveyance) direction through the slide member 74 and the coupling gears 73a and 73b. To limit the movement range, in the horizontal direction, of the coupling gears 73a and 73b and the offset member 60, the shaft 72 has a limiting member 72a engaged with an axially elongated hole 74a provided on the slide member 74. By the limiting member 72a abutting on both ends of the hole 74a when moving along the inside of the hole 74a, the movement range, in the horizontal direction, of the coupling gears 7a and 73b and the offset member 60 are limited.

The driving force from the rotation driving source 65 is transmitted to the driving gear 71 to rotate the driving gear 71, thereby rotating the shaft 72. As the shaft 72 rotates, the rotation is transmitted to the coupling gears 73a and 73b, and the rotation of the coupling gear 73b rotates the support member 63 to rotate the offset rollers 62. Offset rollers 64 abutting on the offset rollers 62, respectively, and rotating as the offset rollers 62 rotate are disposed on a support member 68 disposed parallel to the support member 63.

The offset driving transmission members 80 each including a pinion gear 81 and a rack gear 82 are connected to the offset driving sources 75 disposed in the upper body 510 and the lower body 560. The bodies 61 are fixed to the rack gears 82. The rack gears 82 are moved in the horizontal direction (in the figure, the Y direction) as the pinion gears 81 rotate. Thereby, the rack gears 82 move the bodies 61 in the horizontal direction. The offset driving sources 75 are controlled in synchronism according to the classification signal outputted from the document matching process section 22, and are moved to positions that are different in the horizontal direction in the bodies 61. Thereby, the offset rollers 62 and the offset rollers 64 are simultaneously offset (shifted) in the same direction, whereby the document delivery position is controlled.

Figure 22:
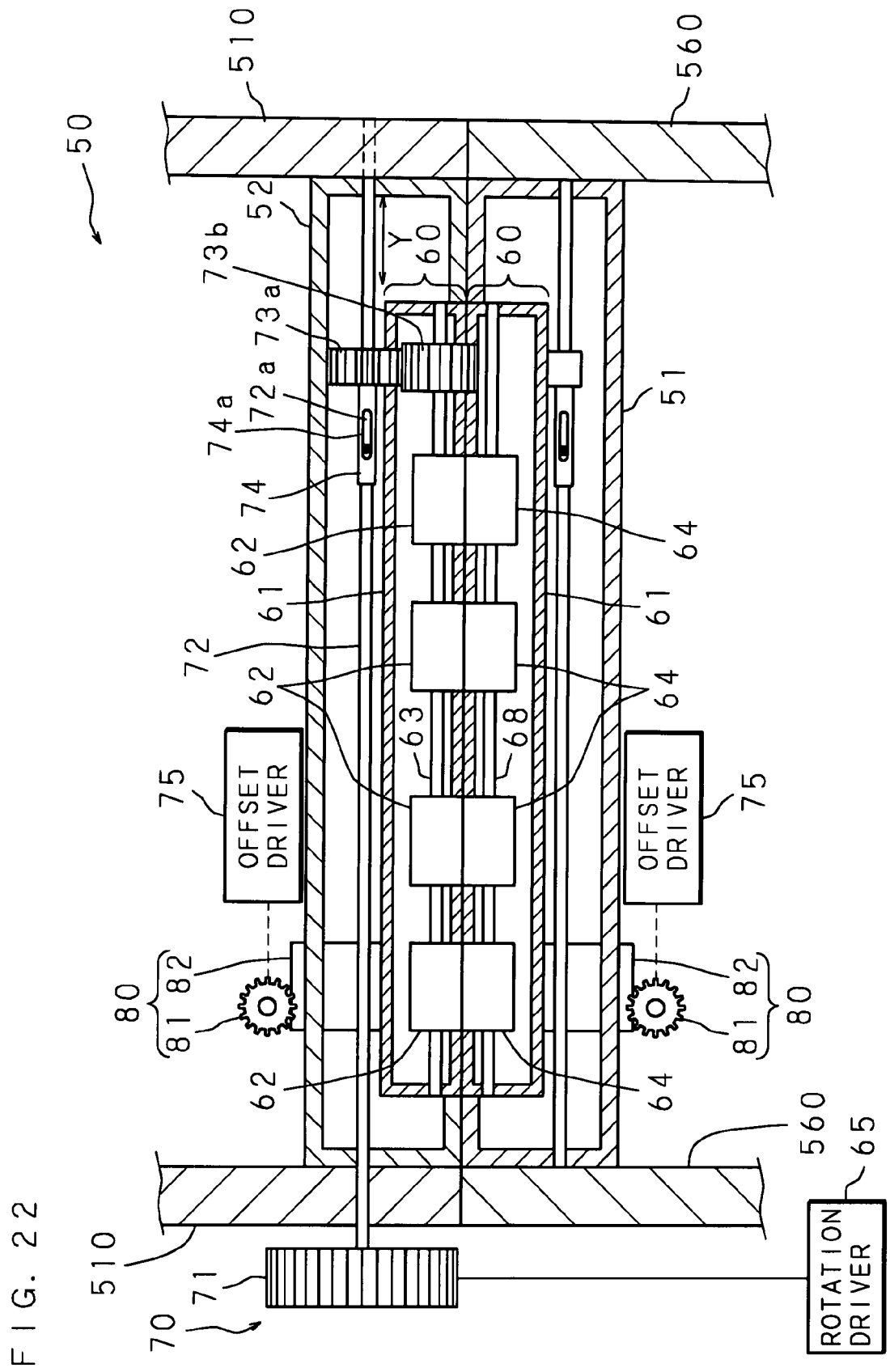
FIG. 22 is a transverse cross-sectional view showing the structure of an document shifter mechanism.
Figure 23:
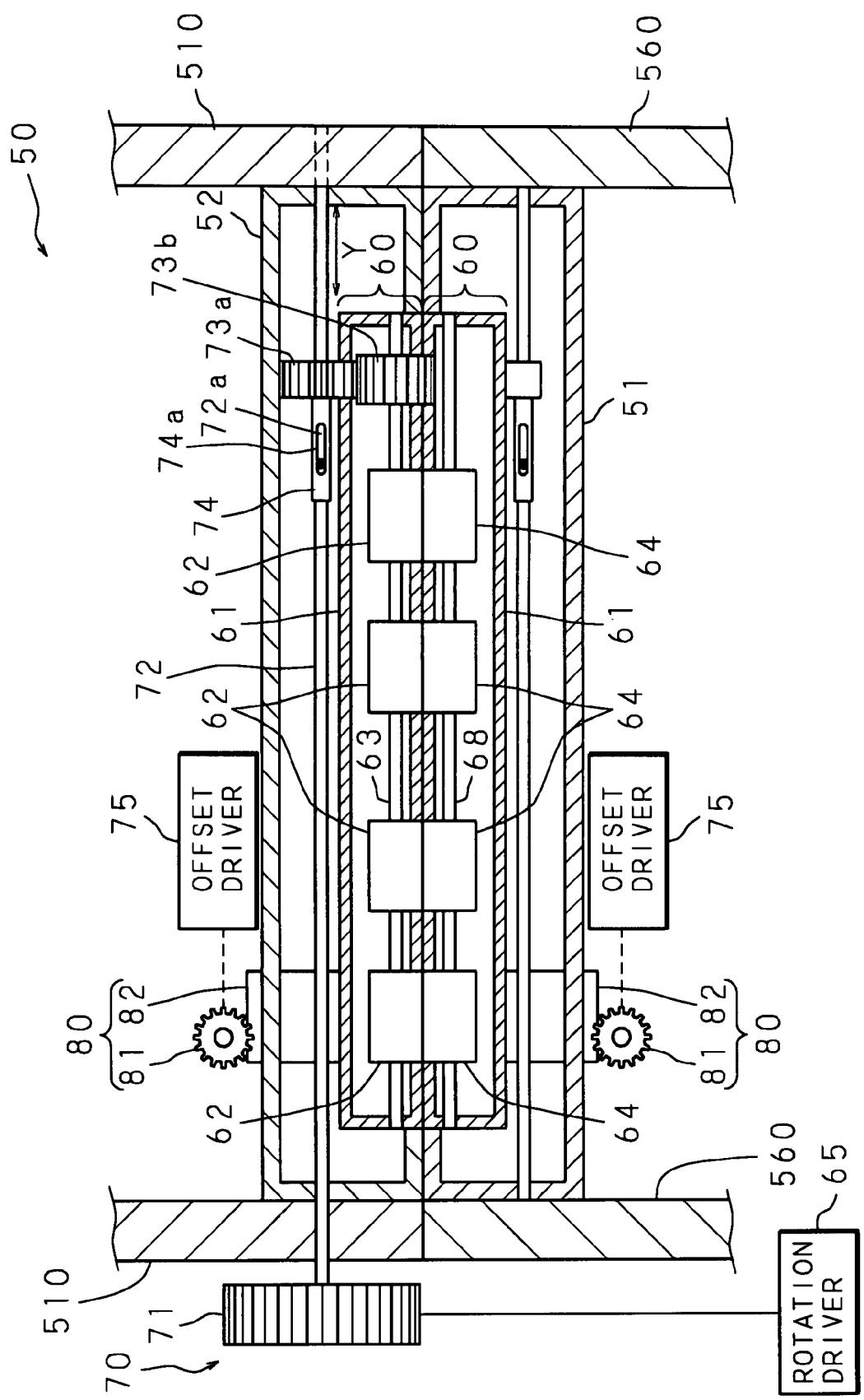
FIG. 23 is a transverse cross-sectional view showing the structure of the document shifter mechanism.

In FIG. 23, the offset rollers 62 and the offset rollers 64 are offset compared to the case of FIG. 22.

Figure 24:
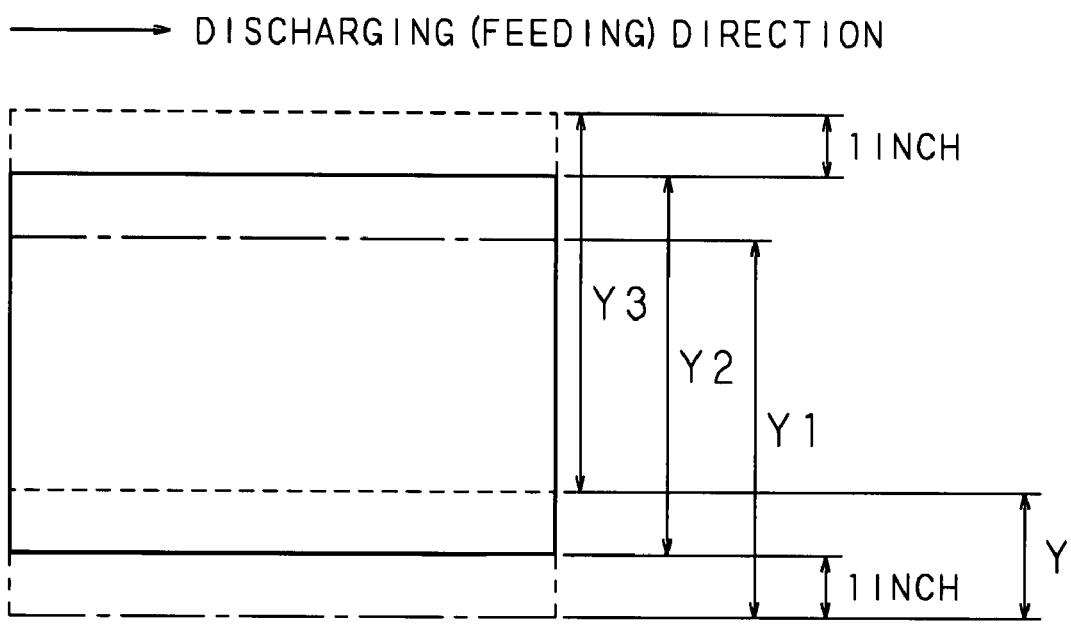
FIG. 24 is an explanatory view showing document delivery positions.

FIG. 24 is an explanatory view showing document delivery positions. This figure shows a case where the documents are classified into three categories. For example, according to the categories C1, C2 and C3, the document delivery positions are offset (shifted), for example, by approximately one inch such as Y1, Y2 and Y3 in a direction (Y direction) orthogonal to the document delivery (conveyance) direction. This makes it unnecessary for the user to visually classify a large number of documents, so that the documents can be easily classified compared to the conventional apparatuses only by reading the document with the document reading apparatus. The offset amount (shift amount) of the documents is not limited to one inch.

While in the above-described embodiment, the hash table and the category table are initialized to erase the contents thereof every time a plurality of documents are read, the present invention is not limited thereto. A structure may be adopted in which the registered pieces of information are not all erased but some are left according to the maximum capacity of the mounted memory. In this case, increase in memory capacity can be prevented by deciding a predetermined storage capacity and erasing the pieces of information in the order in which they are stored. Moreover, in this case, it is unnecessary to register the hash table and the category table based on the image of the document being read first, and the documents can be classified by calculating the similarity based on the image of the document being read first, by using the already stored hash table and category table.

While in the above-described embodiment, when the number of categories into which the documents are classified reaches the predetermined classification number S, the documents successively read thereafter are classified in the category of the document with the largest number of votes, the present invention is not limited thereto. For example, a structure may be adopted in which when the number of categories into which the documents are classified reaches the predetermined classification number S, in a case where the similarity is equal to or higher than the threshold value, the documents successively read thereafter are classified into the category of the document, and in a case where the similarity is lower than the threshold value, it is determined that there is no similar document (nonsimilar), and the documents are classified into the same category. By rereading the documents classified as nonsimilar and repeating similar processing, the documents similar to each other among the documents classified as nonsimilar once can be reclassified.

While one side of the document is read in the above-described embodiment, the present invention is not limited thereto. Both sides of the document may be read. In this case, it may be determined that the document is similar when the similarities of the images of both sides of the document are equal to or higher than the threshold value.

While the document collation processing is performed by the document reading apparatus 500 in the above-described embodiment, the present invention is not limited thereto. A structure may be adopted in which the document collation processing is performed by an external personal computer and the result of the processing is transmitted to the document reading apparatus to thereby classify the documents.

Second Embodiment

While the document shifter mechanism is provided in the above-described first embodiment, the document shifter mechanism is not limited to the one that offsets the documents when delivering them. The delivery tray may be made movable in a direction orthogonal to the document delivery (conveyance) direction. In this case, it is unnecessary to shift the documents in the document shifter mechanism, and only a mechanism that delivers (conveys) the documents is necessary.

Figure 25:
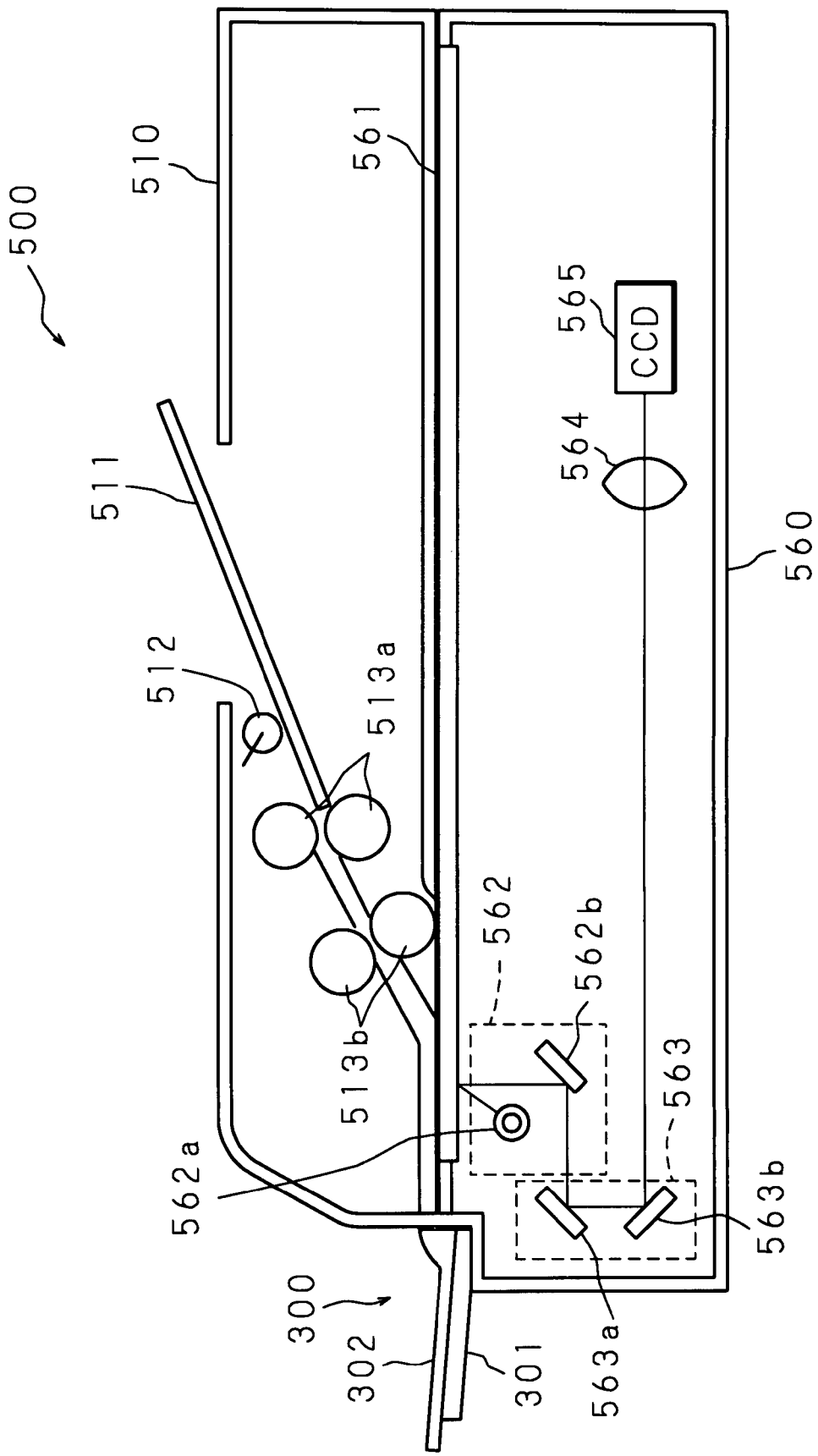
FIG. 25 is a schematic view showing the structure of an document shifter mechanism when an delivery tray is movable.
Figure 26:
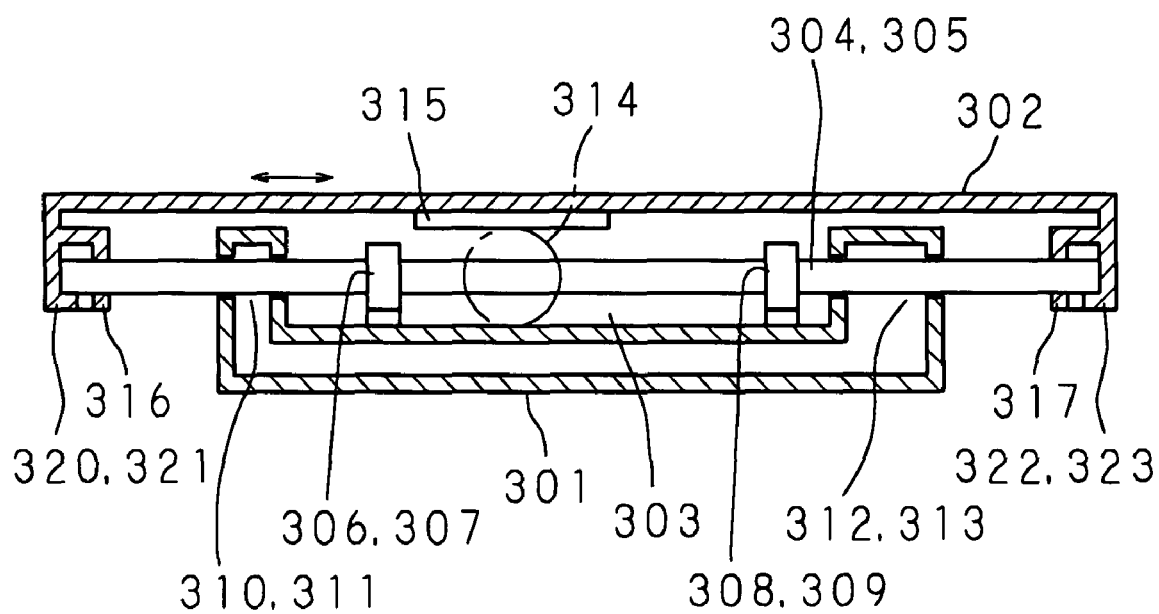
FIG. 26 is a transverse cross-sectional view showing the structure of the document shifter mechanism.

FIG. 25 is a schematic view showing the structure of an document shifter mechanism 300 when the delivery tray is movable. FIG. 26 is a transverse cross-sectional view showing the structure of the document shifter mechanism 300. The document shifter mechanism 300 includes: a support tray member 301 fixed to the body of the document reading apparatus; and a movable tray member 302 disposed above the support tray member 301. Since the structure of the document reading apparatus 500 is similar to that of the first embodiment, the same parts are denoted by the same reference numerals, and description thereof is omitted.

On the upper surface of the support tray member 301, a rectangular concave portion 303 slightly smaller than the outer dimensions is provided, and in a condition of being accommodated in the concave portion 303, two rod-shaped metal guide shafts 304 and 305 substantially parallel to each other are attached so as to be an appropriate distance separated from each other. Specifically, the guide shafts 304 and 305 pass through through holes 310, 311, 312 and 313 formed on the side walls of the support tray member 301 and bearings 306, 307, 308 and 309 provided upright on the bottom surface of the concave portion 303 so as to be an appropriate distance separated from each other, and are supported by the bearings 306, 307, 308 and 309.

In the center of the concave portion 303, a motor, a reduction gear box (not shown) including a gear train, and a driving unit (not shown) having a pinion 314 and the like are provided, and the rotation of the motor is transmitted to the pinion 314 after decelerated by the gear train. To the inside of the upper surface of the movable tray member 302, a rack 315 is attached that is disposed parallel to the guide shafts 304 and 305 and engaged with the pinion 314. By the rotation of the pinion 314, the rack 315 moves in the axial direction of the guide shafts 304 and 305.

On the side edges of the movable tray member 302, protrusions 316 and 317 are formed along the side edges (in the document conveyance direction), and on the protrusions 316 and 317, bearings 320, 321, 322 and 323 in which the ends of the guide shafts 304 and 305 are inserted and supporting the guide shafts 304 and 305 are provided. By the above-described structure, when the motor is driven to rotate the pinion 314, the rotation of the pinion 314 is transmitted to the rack 315, so that the movable tray member 302 moves in a direction (the direction of the arrow in the figure) orthogonal to the sheet conveyance direction with respect to the support tray member 301 by being guided by the guide shafts 304 and 305. The means for moving the movable tray member 302 is not limited to the rack and the pinion mechanism. A different mechanism such as an endless belt mechanism or a linear motor may be used.

When the movable tray member 302 is moved in the direction orthogonal to the document delivery (conveyance) direction, for example, it can be moved by appropriately one inch as in the first embodiment. This makes it unnecessary for the user to visually classify a large number of documents, so that the documents can be easily classified compared to the conventional apparatuses only by reading the document with the document reading apparatus. The offset amount (shift amount) of the documents is not limited to one inch.

Third Embodiment

While the documents are offset when delivered in the above-described first and second embodiments, the document classification method is not limited thereto. A structure may be adopted in which a plurality of delivery trays are provided and the delivery tray into which the document is to be delivered is switched according to the classification signal.

Figure 27:
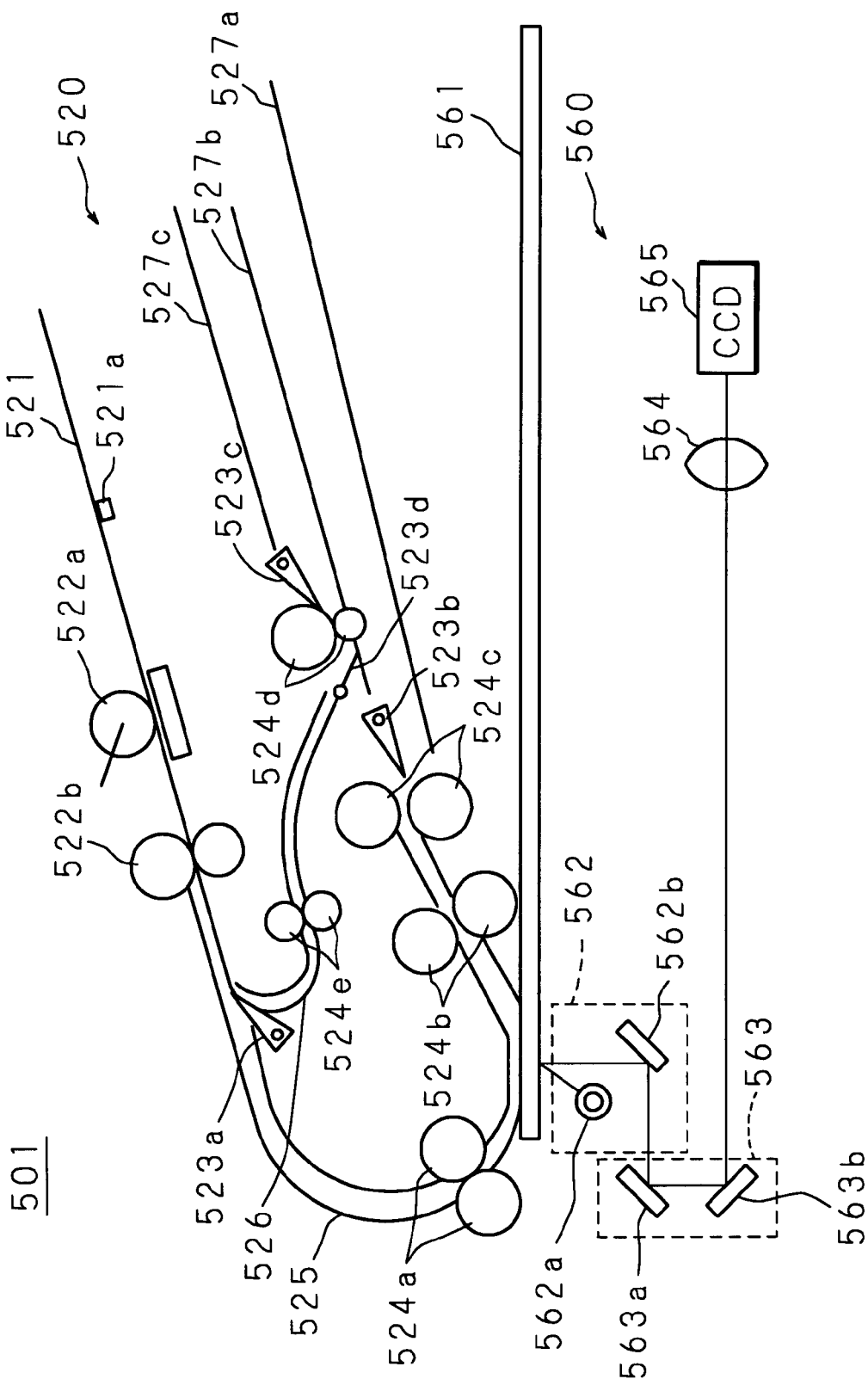
FIG. 27 is a schematic view showing the structure of an document reading apparatus of a third embodiment.

FIG. 27 is a schematic view showing the structure of an document reading apparatus 501 of a third embodiment. An document conveyance 520 includes: an document tray 521; a rotatable leading roller 522a and sorting rollers 522b for conveying, one by one, the documents placed one on another on the document tray 521; a conveyance path 525 for conveying the conveyed documents to delivery trays 527a, 527b and 527c; and a resist roller 524a, a conveyance roller 524b and an delivery roller 524c provided in the midstream of the conveyance path 525 as appropriate.

On the downstream side of the delivery roller 524c, gates 523b, 523d (situated in a downward direction because of flexibility or self weight) and 523c for switching the delivery tray into which the document is delivered are provided, and between the gates 523d and 523c, conveyance rollers 524d are disposed. When the documents are delivered, based on the classification signal, the gates 523b, 523d and 523c are driven, the documents in the category C1 are delivered into the delivery tray 527a, the documents in the category C2 are delivered into the delivery tray 527b, and the documents that cannot be classified into none of the categories C1 and C2 are delivered into the delivery tray 527c as nonsimilar.

That is, when the documents in the category C1 are delivered, by driving the gate 523b upward, the documents are delivered into the delivery tray 527a. When the documents in the category C2 are delivered, by driving the gate 523b downward and driving the gate 523c upward, the documents are delivered into the delivery tray 527b. When the documents are delivered as similar to none of the categories C1 and C2, by driving the gate 523b downward and driving the gate 523c downward, the documents are delivered into the delivery tray 527c. The number of classification categories can be increased by increasing the number of delivery trays.

The document placement surface of the document tray 521 has an document sensor 521a detecting the presence or absence of the document. When all the documents placed on the document tray 521 are conveyed, the document sensor 521a outputs a signal representing that no document is present. Thereby, it can be determined whether the conveyance of all the documents is finished or not.

On the downstream side of the sorting rollers 522b, an document conveyance path 526 diverging from the conveyance path 525 and bent approximately 180 degrees is provided. In the midstream of the document conveyance path 526, rotatable document rollers 524e are provided, and the delivery tray 527c is attached so as to connect with the document conveyance path 526. The leading roller 522a, the sorting rollers 522b and the document rollers 524e rotate normally and in reverse by a roller driver (not shown).

At the diverging point of the conveyance path 525 and the document conveyance path 526, a gate 523a swingable by a gate driver (not shown) is disposed, and by driving the gate 523 downward, the documents placed on the document tray 521 are conveyed to the side of the conveyance path 525. On the other hand, by driving the gate 523a upward, the documents delivered into the delivery tray 527c once are conveyed to the document tray 521. That is, in the present embodiment, the documents delivered into the delivery tray 527c as nonsimilar documents that can be classified into none of the categories C1 and C2 can be successively classified without the documents being newly set.

Since the scanner section 560 constituted by the lower body is similar to those of the first and second embodiments, the same parts are denoted by the same reference numerals, and description thereof is omitted.

Fourth Embodiment

While the document reading apparatus 501 includes a plurality of delivery trays in the third embodiment, the method of delivering the documents in a classified condition is not limited thereto, and a different structure may be adopted. For example, a structure may be adopted in which an option mechanism having a plurality of stages of delivery trays is added instead of the delivery trays.

Figure 28:
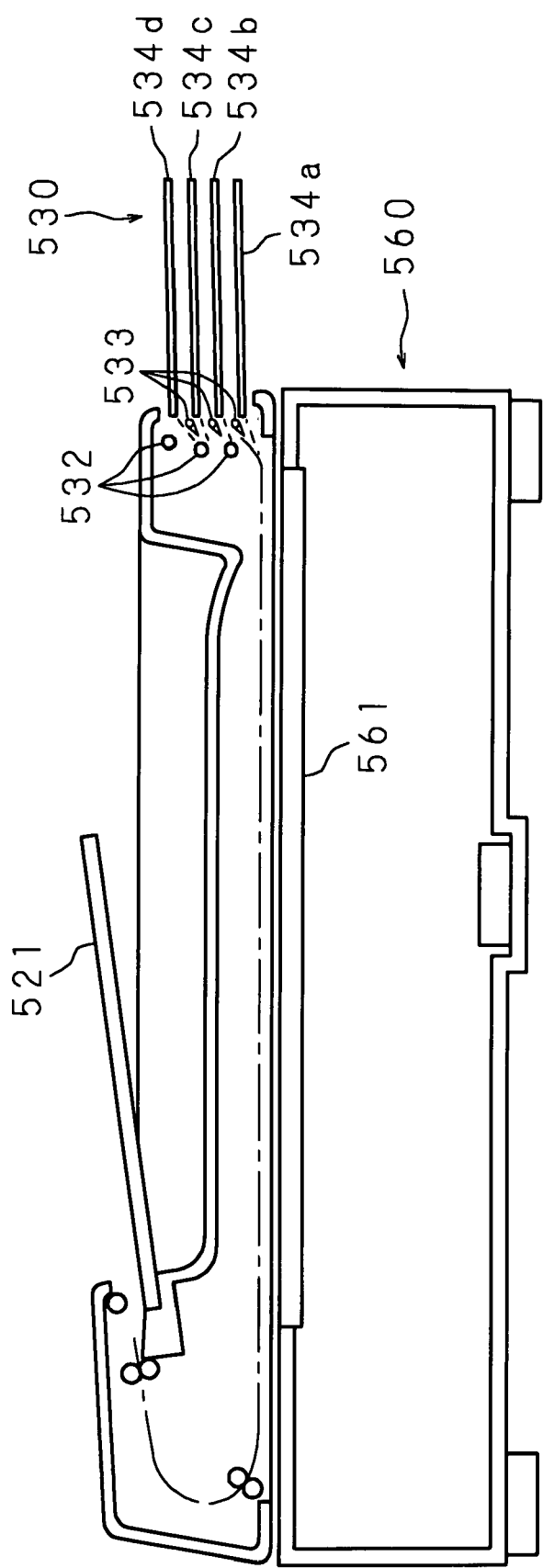
FIG. 28 is a schematic view showing the structure of an document reading apparatus of a fourth embodiment.

FIG. 28 is a schematic view showing the structure of an document reading apparatus 502 of a fourth embodiment. As shown in the figure, an option mechanism 530 for delivering the documents in a classified condition is provided. The option mechanism 530 includes delivery trays 534a, 534b, 534c and 534d, gates 533 switching the document conveyance path for delivering the document so as to be sorted in the delivery trays, and delivery rollers 532. The delivery of the documents is not described because it is similar to that of the second embodiment.

Fifth Embodiment

The above-mentioned description may be applied to electronic data, that is data created with application software, and scanned and filed data (electronized data), that is data converted in a format such as JPEG and PDF from scanned data. Data provided in a form such as the electronic data and the scanned and filed data may be stored in a server. Preferably, the stored data is categorized according to such as the file formats.

Here, the electronic data is vector data such as fonts and graphs created by tools such as word process sections, and data consisting of both coded data and raster image data. In the case of this electronic data, since the data includes the vector data or the coded data, a process for the electronic data is different from the processes described in the embodiments above which is applied to the images scanned by the image reading devices such as scanners.

Figure 29:
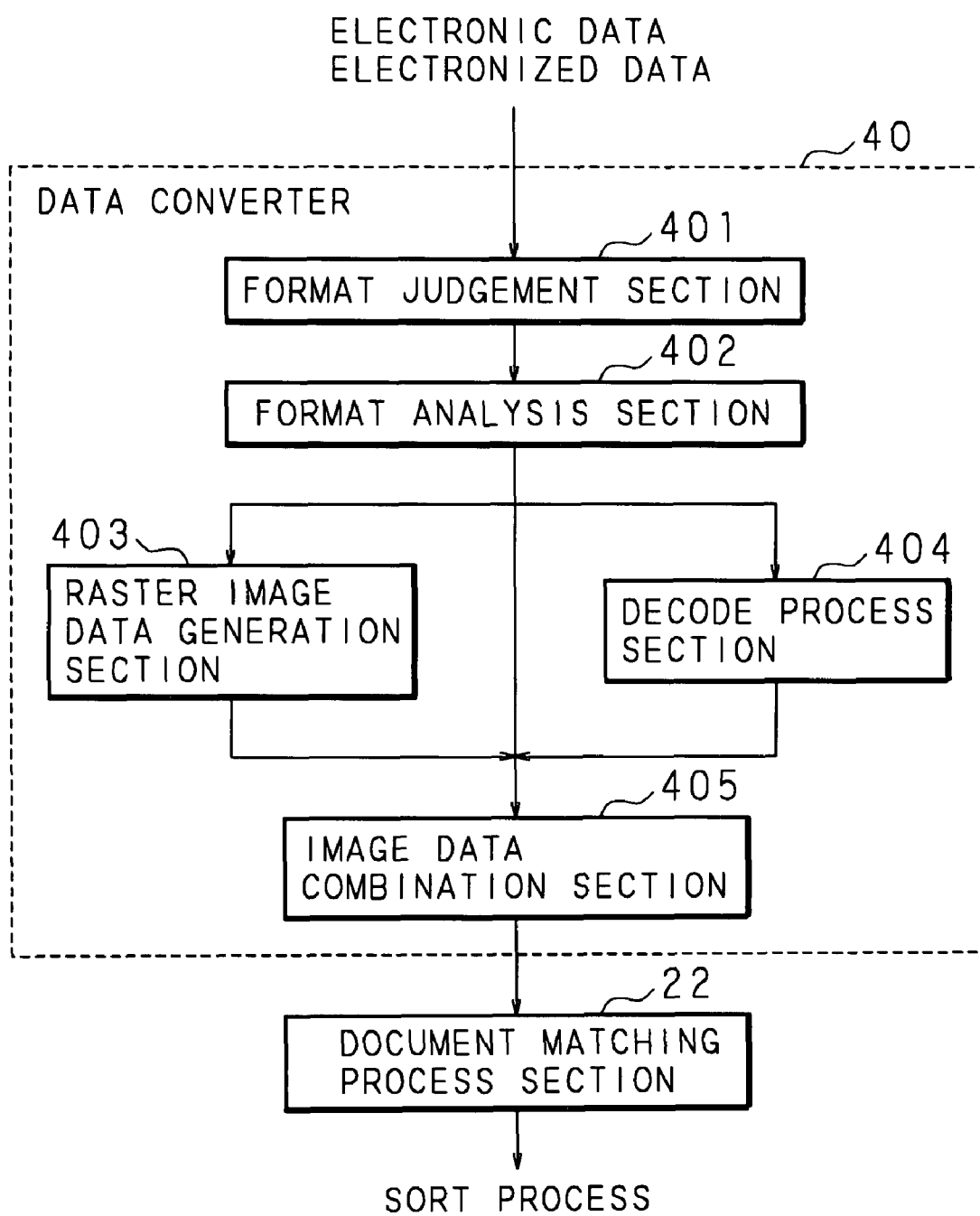
FIG. 29 is a block diagram of the structure of the data converter for converting electronic data or scanned and filed data.
Figure 30:
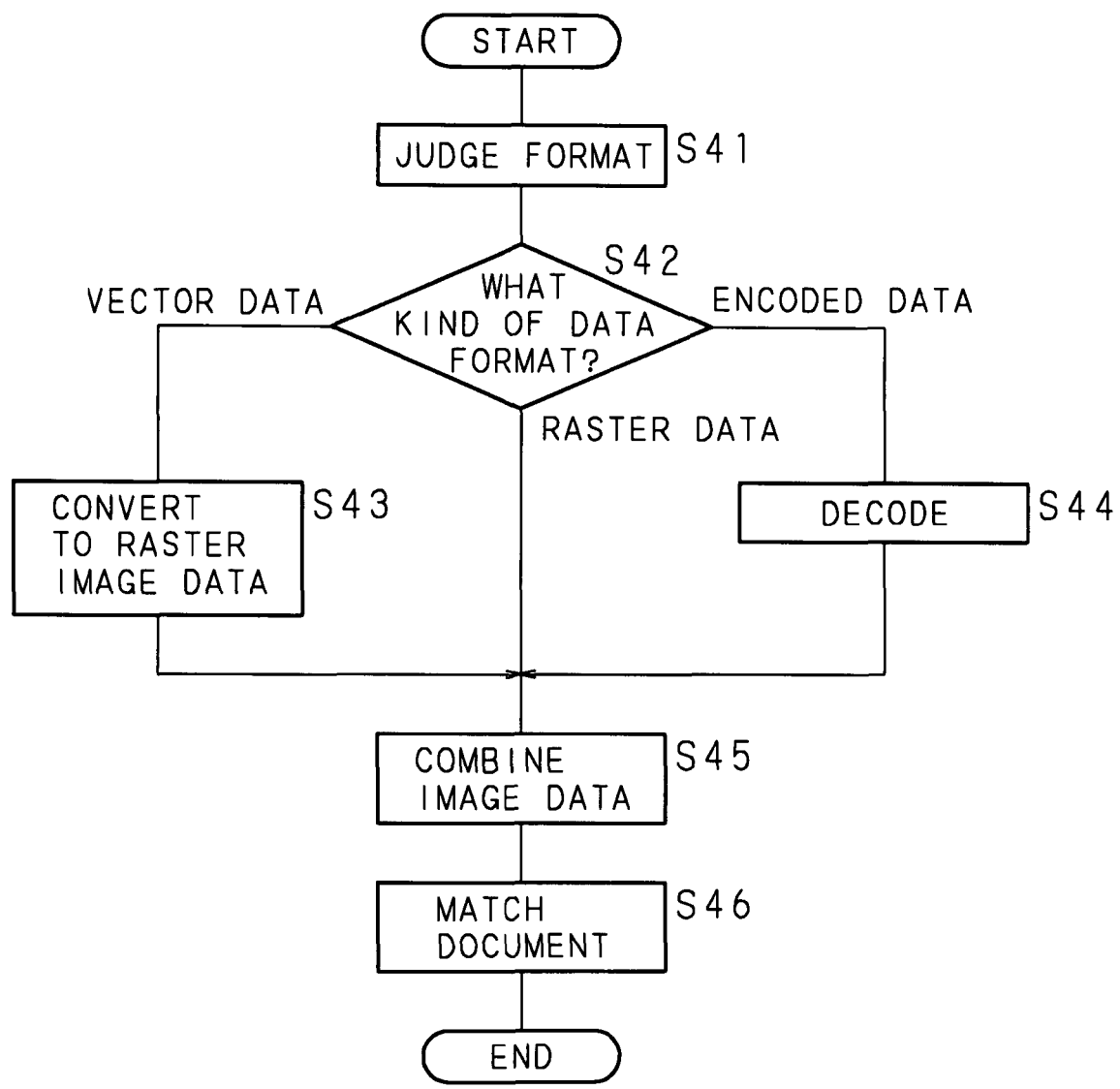
FIG. 30 is a flowchart showing the procedure of the classification process.

In FIG. 29, for such electronic data, an exemplary block diagram of a data converter is illustrated, and FIG. 30 shows a flow chart of the processes implemented by such data converter. A data converter 40 comprises a format judging part (format estimator) 401, a format analyzer 402, a raster image data generator 403, decoder 404, image data compiler 405 and the like. Here, the data converter 40 may be not only a customized hardware circuit but also a microcomputer with a CPU, RAM, ROM, and the like. Such microcomputer may achieve its functions by performing a computer program which is loaded in the RAM and is intended to define data conversion processes. Also, the data converter 40 can be assembled in the color image process section 2.

The data converted by the data converter 40 is output to the document matching process section 22. In the document matching process section 22, the input image data (the electronic data or scanned and filed data) are applied to, as described in the First Embodiment, the document collation process. Then, the input image data (the electronic data or scanned and filed data) are registered on by one and classified to be filed.

The format estimator 401 judges the format of the data based on a header, an extension, and the like of the input electronic or scanned and filed data.

The format analyzer 402 analyzes the format of the data to degrade the data into vector data, raster data and encoded data, according to description rules of the judged format. The description rules include, for example, a rule that a file accompanies tags corresponds to a text, a figure, a photo, or the like. In this case, the tags allows the data to be analyzed for its format.

The raster image data generator 403 converts the vector data to raster data and the raster data to RGB bitmap data. To do so, a raster image process section (RIP) can be used to interpret a page description language (PDL). Also, corresponding converting tools to the formats of the vector data can be prepared.

The decoder 404 decodes the encoded data to convert to the RGB bitmap data, according to its encoding manner. For example, in the case of the JPEG format, the data is decoded and its YCC signals are converted to the RGB signals. The raster data still remains.

The image data compiler 405 compiles the inputs of the raster data from the raster image data generator 403 and the decoder 404 and the like into one RGB bitmap data. It outputs the compiled RGB bitmap data (image data) to the document matching process section 22.

The document matching process section 22, as exemplified in the description of the First Embodiment, judges the similarity. Based on the judging result, the document matching process section 22 registers the electronic data according to the description of the above-mentioned Embodiments, and classifies the registered electronic data, i. e. files it in corresponding folder. Also in this Fifth Embodiment, objects (electronic data) classified as dissimilar are stored in the miscellaneous folder. For these electronic data in the miscellaneous folder, the registration and classification processes are applied.

As shown in FIG. 30, the data converter 40 judges the format of the input image data (the electronic data or scanned and filed data) (S41). And the data converter 40 analyzes what kind of the data formats the image data takes, according to the description rules of the judged format (S42).

In the case that the format is a vector-type (in the case of the vector data at S42), the data converter 40 converts the vector data to the raster image data (S43). In the case that the format is an encode-type (in the case of the encoded data at S42), the data converter 40 decodes the encoded data (S44). In the case that the format is a raster-type (in the case of the raster data at S42), the data converter 40 proceeds to a process of the step S45.

Figure 18:
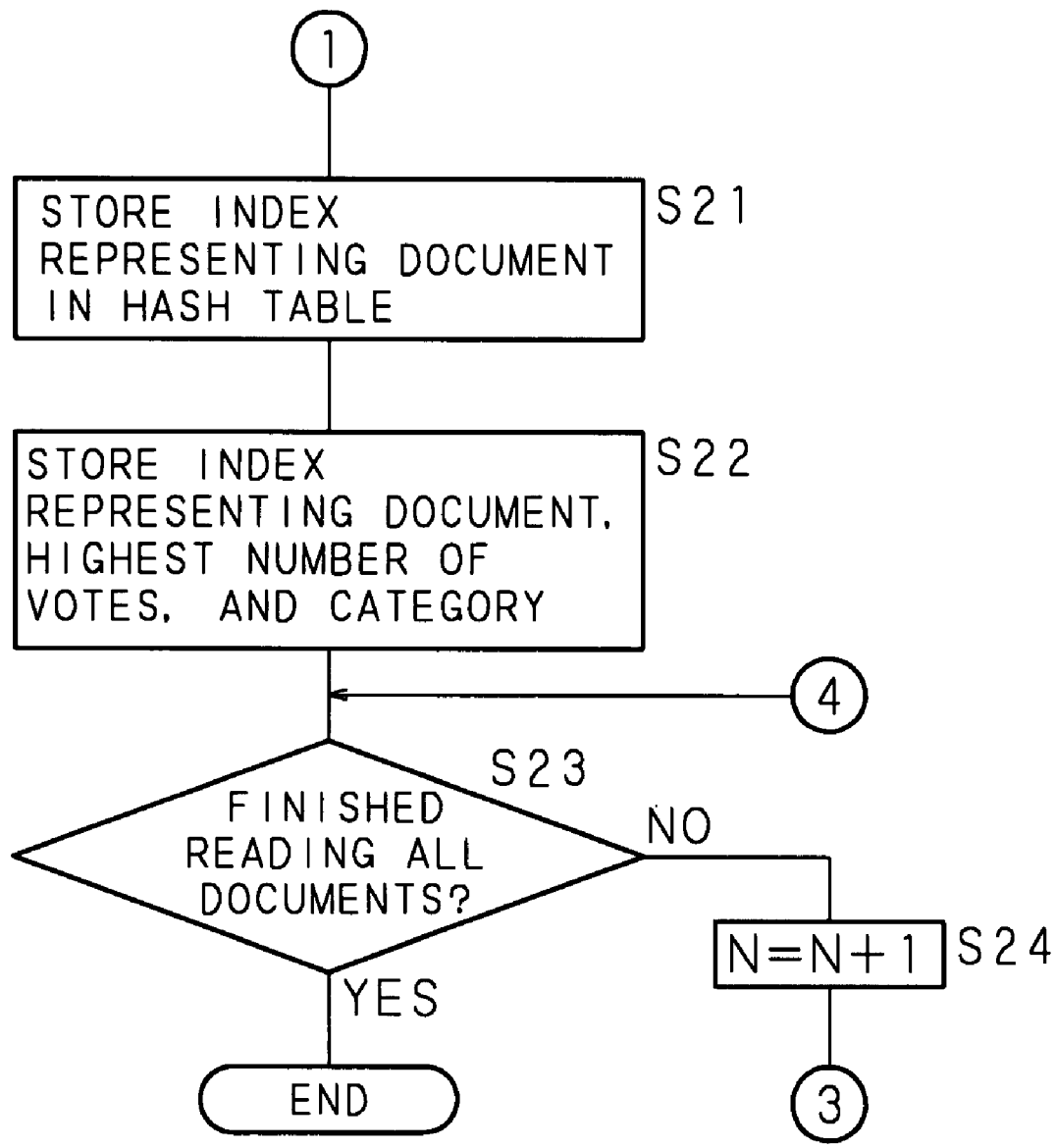
FIG. 18 is a flowchart showing the procedure of the document classification processing of the color image processing apparatus.
Figure 19:
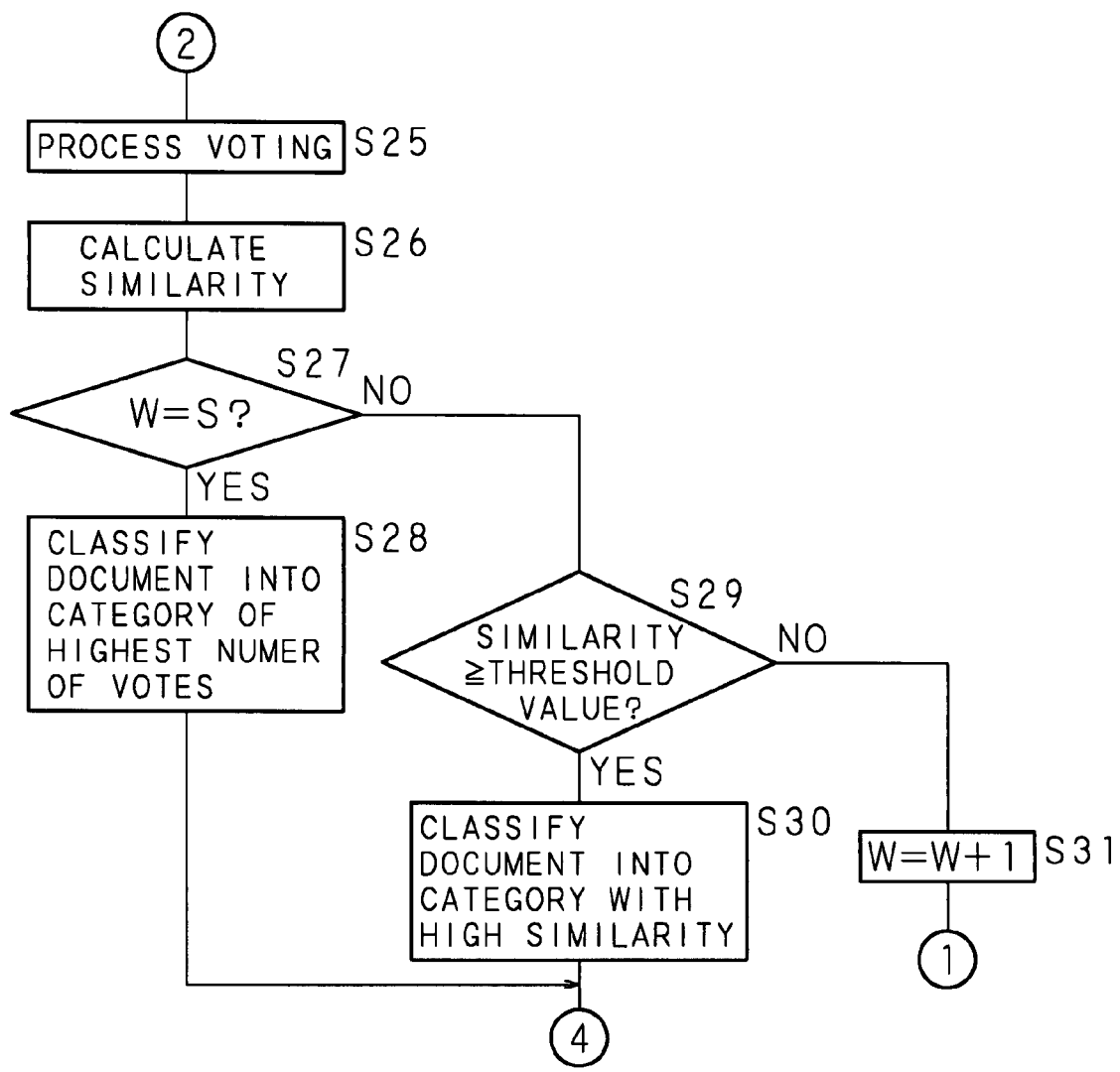
FIG. 19 is a flowchart showing the procedure of the document classification processing of the color image processing apparatus.

The data converter 40 compiles the image data (S45). The document matching process section 22 registers the electronic data and files it in the folder. The process is terminated. In this Fifth Embodiment, the document matching process section functions same as exemplified in FIGS. 17 to 19, taking objects to be processed as the electronic data or the like out of the images obtained by scanning the documents.

As described above, in the present Embodiments, the documents can be classified without the need for storing the document format information or the like of the documents. Moreover, the documents (or the image data) can be classified according to the predetermined classification number. The electronic or scanned and filed data can be registered one after another to be classified, i. e. filed. Moreover, even when documents (or image data) that cannot be classified according to the predetermined classification number are present, the documents (or the image data) that can be classified and the documents (the image data) that cannot be classified can be distinguished from each other. Moreover, the documents (or the image data) similar to each other among the documents (or the image data) classified as nonsimilar once can be reclassified. Further, it is unnecessary for the user to manually classify the documents, and the documents can be automatically classified only by reading the documents by the document reading apparatus, so that user convenience is significantly improved. Moreover, the image data being read may be stored (filed) in a predetermined folder based on the classification signal. The file may be stored in the memory of the image forming apparatus, or may be stored in an external storage device or a server connected through a network.

In the above-described embodiments, as the color image input apparatus 1, for example, a flathead scanner, a film scanner, a digital camera or a mobile telephone is used. As the color image output apparatus 3, for example, an image display device such as a CRT display or a liquid crystal display, or an electrophotographic or inkjet printer that outputs the processing result onto recording paper or the like is used. As the image forming apparatus 100, a modem as communication means for connecting to a server apparatus or the like through a network may be provided. Moreover, a structure may be adopted in which color image data is obtained from an external apparatus, a server apparatus or the like through a network instead of obtaining color image data from the color image input apparatus 1.

While the memory 225 and the controller 226 are provided in the document matching process section 22 in the above-described embodiments, the present invention is not limited thereto. A structure may be adopted in which the memory 225 and the controller 226 are provided outside the document matching process section 22.

In the present embodiment, program codes (a program in an executable form, an intermediary coded program, or a source program) for performing the document classification processing may be recorded in a computer-readable recording medium recording the program codes to be executed by a computer. Consequently, a recording medium recording the program codes for performing the document classification processing can be portably provided. As the recording medium, since the processing is performed by a microcomputer, a non-illustrated memory, for example, a program media such as a ROM may be used, or a program media may be used that is readable by inserting a recording medium in a program reader provided as an external storage device which is not shown.

In any of these cases, a structure may be adopted in which the stored program codes are accessed by the microcomputer for execution, or a method may be adopted in which the program codes are read and the program codes being read are downloaded into a non-illustrated program storage area of the microcomputer for execution. In this case, the computer program for download is prestored in the main apparatus.

Here, the program medium is a recording medium separable from the main body, and may be a tape such as a magnetic tape or a cassette tape; a disk such as a magnetic disk such as a floppy disk (registered trademark) or a hard disk, or an optical disk such as a CD-ROM, an MO, an MD or a DVD; a card such as an IC card (including a memory card) or an optical card; or a medium fixedly carrying program codes including a semiconductor memory such as a mask read only memory (ROM), an erasable programmable read only memory (EPROM), an electrically erasable programmable read only memory (EEPROM) or a flash ROM.

In this case, since the system configuration is such that communication networks including the Internet can be connected thereto, a medium fluidly carrying program codes such as downloading it from a communication network may be used. When program codes are downloaded from a communication network as mentioned above, the computer program for download may be prestored in the main apparatus or may be installed from another recording medium. Further, in one embodiment, there may be embodied a form of computer data signals which is embedded in a carrier wave which is intended to transmit the program codes electromagnetically.

In an embodiment, the feature vectors of the image of the document being read first and the identifier assigned for classifying the document are stored, it is determined whether or not the feature vectors of the images of the documents successively read after the document being read first match with the feature vectors of the image of the document classified by the stored identifier, for each matching feature vector, the image from which the feature vector is extracted is voted, whether the stored identifier is assigned or a new identifier is assigned to the documents being successively read is determined based on the number of votes obtained by the voting, and when the new identifier is assigned, the feature vectors of the image of the document classified by the identifier, and the identifier are stored. By classifying the documents based on the assigned identifier, the documents can be classified without the need for storing the document format information or the like of the documents.

In an embodiment, when the number of stored identifiers does not reach a predetermined number, the image similarity is calculated based on the number of votes obtained by the voting, and whether the stored identifier is assigned or the new identifier is assigned to the documents being successively read is decided based on the calculated image similarity, whereby the documents can be classified according to the predetermined classification number.

In an embodiment, when the number of stored identifiers reaches the predetermined number, whether the stored identifier is assigned to the documents being successively read or the documents are classified as nonsimilar is decided based on the calculated image similarity, whereby even when documents that cannot be classified according to the predetermined classification number are present, the documents that can be classified and the documents that cannot be classified can be distinguished from each other.

In an embodiment, when documents classified as nonsimilar are present, the documents similar to each other among the documents classified as nonsimilar once can be reclassified by repeating the following processings at least once: The stored feature vectors and identifier are erased; the documents classified as nonsimilar are successively read again; the feature vectors of the image of the document being read first and the identifier assigned for classifying the document are stored; it is determined whether or not the feature vectors of the images of the documents successively read after the document being read first match with the feature vectors of the image of the document classified by the stored identifier; for each matching feature vector, the image from which the feature vector is extracted is voted; whether the stored identifier is assigned or a new identifier is assigned to the documents being successively read is decided based on the number of votes obtained by the voting; and when the new identifier is assigned, the feature vectors of the image of the document classified by the identifier, and the identifier are stored.

In an embodiment, when the number of stored identifiers reaches a predetermined number, of the stored identifiers, the identifier of the document corresponding to the image with the largest number of votes obtained by the voting is assigned to the documents being successively read, whereby the documents can be classified according to the predetermined classification number.

In an embodiment, by providing document delivery means for changing the document delivery position according to the classification, the classified documents can be easily sorted.

In an embodiment, by providing document delivery means for delivering the documents into different delivery trays according to the classification, the classified documents can be easily sorted.

In an embodiment, it is determined whether or not the feature vectors of the images of the documents being successively read match with the feature vectors of the image of the document classified by the stored identifier, for each matching feature vector, the image from which the feature vector is extracted is voted, whether or not the stored identifier is assigned to the documents being successively read is decided based on the number of votes obtained by the voting, and classification and delivery means is provided for delivering the documents in a condition of being classified according to the decided classification, whereby the documents themselves can be classified.

As this description may be embodied in several forms without departing from the spirit of essential characteristics thereof, the present embodiments are therefore illustrative and not restrictive, since the scope is defined by the appended claims rather than by description preceding them, and all changes that fall within metes and bounds of the claims, or equivalence of such metes and bounds thereof are therefore intended to be embraced by the claims.

What is claimed is:
1. An image processing method comprising:
   reading a first document to obtain a first image;
   extracting a plurality of first feature vectors from the first image;
   storing the first feature vectors and a first identifier assigned to classify the first document;
   successively processing with a processor a plurality of subsequently-read documents, the processing of each subsequently-read document comprising:
      reading the subsequent document to obtain a subsequent image;
      extracting a plurality of subsequent feature vectors from the subsequent image;
      determining a number of matched feature vectors by determining how many of the subsequent feature vectors match one or more of the first feature vectors;
      based on the determined number of matched feature vectors, assigning the first identifier or a new identifier to the subsequent document;
      when the new identifier is assigned, storing the subsequent feature vectors and the new identifier; and
      classifying the subsequent document based on its assigned identifier.
2. The image processing method according to claim 1, further comprising:
   calculating an image similarity based on the determined number of matched feature vectors,
   wherein, when the number of stored identifiers does not reach a predetermined extent the assignment of the stored first identifier or the new identifier to the subsequently-read document is further based on the calculated image similarity.
3. The image processing method according to claim 2, wherein, when the number of stored identifiers reaches the predetermined extent, the stored first identifier is assigned to the subsequently-read document or the subsequently-read document is classified as non-similar based on the calculated image similarity.
4. The image processing method according to claim 3, wherein, when the subsequently-read document is classified as non-similar, the stored feature vectors and at least the first identifier are erased from storage, the subsequently-read document classified as non-similar is treated as the first document, and all steps of the image processing method are repeated.

5. An image processing method comprising:

extracting a plurality of first feature vectors from data representing a first-input image;

storing the first feature vectors and a first identifier assigned for classifying the first-input image;

successively processing with a processor data representing a plurality of subsequently-input images, the processing of data for each subsequently-input image comprising:

extracting a plurality of subsequent feature vectors from the data of the subsequently-input image;

determining a number of matched feature vectors by determining how many of the subsequent feature vectors match one or more of the first feature vectors;

based on the determined number of matched feature vectors, assigning the first identifier or a new identifier to the subsequently-input image;

when the new identifier is assigned, storing the subsequent feature vectors and the new identifier; and classifying the subsequently-input image based on its assigned identifier.

6. An image processing apparatus comprising:

an image reading device that successively reads a plurality of documents and respectively obtains images corresponding thereto;

an extracting device that extracts feature vectors from each image;

a storage that stores feature vectors of a first image corresponding to a first-read document of the plurality of documents and a first identifier assigned for classifying the first- read document; and a subsequent image processing section, including:

a feature vector analysis section that for each subsequently-read document determines how many of the feature vectors of a subsequent image obtained from the subsequently-read document match one or more of the feature vectors of the first image;

an identifier assignment process section that, based on the determined number of matched feature vectors, assigns the stored first identifier to the subsequently-read document or assigns a new identifier to the subsequently-read document; and a document classification process section that classifies the subsequently-read document based on the assigned identifier, wherein when the new identifier is assigned to the subsequently-read document, the storage stores the new identifier and the feature vectors of the subsequently-read image.

7. A document reading apparatus for reading a document, comprising:

the image processing apparatus according to claim 6; and a paper delivery section that delivers each document in a classified condition as classified by the image processing apparatus according to the assigned identifier.

8. The document reading apparatus according to claim 7, wherein a document delivery position is changed according to the classification.

9. An image forming apparatus comprising:

the document reading apparatus according to claim 7; and image forming means for forming an output image based on at least one of the images obtained by the document reading apparatus.

10. An image processing apparatus comprising:

an extracting section that extracts feature vectors from each of a plurality of image data sets including a first-input image data set and at least one subsequently-input image data set;

a storage device that stores both the feature vectors of the first-input image data set and a first identifier assigned for classifying the first-input image data set; and a subsequently-input image data set processing section, including:

a feature vector analysis section that determines how many of the feature vectors extracted from each subsequently-input image data set match one or more of the feature vectors of the first-input image data set;

an identifier assignment process section that assigns the stored first identifier to the subsequently-input image data set or assigns a new identifier to the subsequently-input image data set based on the determined number of matched feature vectors; and an image data set classification process section that classifies the subsequently-input image data set based on the assigned identifier, wherein, when the new identifier is assigned to the subsequently-input image data set, the storage stores the feature vectors of the subsequently-input image data set classified by the new identifier, and the new identifier.

11. The image processing apparatus according to claim 6, wherein when the number of stored identifiers reaches a predetermined extent, the identifier of the document corresponding to the image with the largest number of matching feature vectors determined by the feature vector analysis section is assigned to each document read after the predetermined extent is reached.

12. The image processing apparatus according to claim 6, further comprising a similarity calculator that calculates an image similarity based on the determined number of matched feature vectors, wherein when the number of stored identifiers does not reach a predetermined extent, the assignment of the stored first identifier or the new identifier to the subsequently-read document is further based on the image similarity calculated by the similarity calculator.

13. The image processing apparatus according to claim 12, wherein when the number of stored identifiers reaches the predetermined extent, the stored first identifier is assigned to the subsequently-read document or the subsequently-read document is classified as non-similar based on the image similarity calculated by the similarity calculator.

14. An document reading apparatus for reading a document, comprising:

the image processing apparatus according to claim 13;

a paper delivery section that delivers each document classified in a classified condition as classified by the image processing apparatus according to the assigned identifier; and a conveyer that conveys the documents classified as non-similar to the image reading device, to reread the documents, wherein, when the documents are reread the stored feature vectors and at least the stored first identifier are erased from storage.

15. The document reading apparatus according to claim 14, wherein a document delivery position is changed according to the classification.

16. A document reading apparatus for reading a plurality of documents, comprising:
- a storage that stores both a plurality of feature vectors of an image of a first document and an identifier assigned for classifying the first document;
- a feature vector analysis section that, for each document successively read, determines how many feature vectors of an image extracted from the successively read document match one or more of the stored feature vectors;
- an identifier assignment process section that, based on the determined number of matching feature vectors, assigns the stored identifier to the subsequently-read document; and
- a paper delivery section that delivers the successively-read documents in a condition of being classified according to the identifier assigned by the identifier assignment process section.

17. A non-transitory, computer-readable storage medium having stored thereon a plurality of steps which when executed by a computer cause the computer to extract a plurality of feature vectors of each of images obtained by successively reading a plurality of documents and perform processing to classify the documents based on the extracted feature vectors, the steps comprising:
- extracting the feature vectors of the image of the document being read first;
- assigning a first identifier to the first-read document for classifying the first-read document based on the extracted feature vectors of the first-read document;
- storing the feature vectors of the first-read document and the first identifier;
- determining how many of the feature vectors corresponding to a document of the plurality of successively read documents read subsequently to the first-read document match one or more of the feature vectors of the image of the first-read document classified by the first identifier;
- assigning the first identifier or a new identifier to the subsequently-read document, based on the number of matching feature vectors; and
- when the new identifier is assigned, storing the feature vectors corresponding to the subsequently-read document and the new identifier.

18. The non-transitory computer-readable storage medium according to claim 17, further comprising the step:
- calculating an image similarity based on the determined number of matching feature vectors, wherein
- the assignment of the first identifier or the new identifier is dependent on whether the number of stored identifiers is below a predetermined extent and is further based on the calculated image similarity.

19. The non-transitory computer-readable medium according to claim 18, wherein:
- when the number of stored identifiers reaches the predetermined extent, the subsequently-read document is either assigned the first identifier or is classified as non-similar, based on the calculated image similarity.

20. The non-transitory computer-readable medium according to claim 19, further comprising the steps of:
- erasing at least the first identifier from storage; and
- repeating the steps of claim 17 using the documents previously classified as non-similar as the plurality of documents.

21. A non-transitory computer-readable storage medium having recorded thereon a plurality of steps which when executed by a computer cause the computer to successively extract a plurality of feature vectors of each of a plurality of image data sets and to perform processing to classify the plurality of the image data sets based on the extracted feature vectors, the steps comprising:
- extracting the feature vectors of the image of the image data set being input first;
- assigning a first identifier to the first-input image data set for classifying the first-input image data set based on the extracted feature vectors of the first-input image data set;
- storing the feature vectors of the first-input image data set and the first identifier;
- determining how many of the feature vectors extracted from an image data set of the plurality of image data sets input subsequently to the first-input image data set match one or more of the feature vectors of the first-read image data set classified by the first identifier;
- assigning the first identifier or a new identifier to the subsequently-input image data set, based on the determined number of matching feature vectors; and
- when the new identifier is assigned, storing the feature vectors corresponding to the subsequently-input image data set and the new identifier.

* * * * *